United States Patent [19]
Inman

[11] Patent Number: 5,903,915
[45] Date of Patent: *May 11, 1999

[54] CACHE DETECTION USING TIMING DIFFERENCES

[75] Inventor: Bradly L. Inman, Hillsboro, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/405,238

[22] Filed: Mar. 16, 1995

[51] Int. Cl.$^6$ .................................................. G06F 12/08
[52] U.S. Cl. ........................................... 711/167; 711/118
[58] Field of Search ............................. 395/497.03, 494, 395/497.01, 450, 445, 455, 456; 371/21.1, 21.2, 21.3; 711/118, 123, 128, 129, 167, 170, 172

[56] References Cited

U.S. PATENT DOCUMENTS

| | | | |
|---|---|---|---|
| 4,991,088 | 2/1991 | Kam | 395/455 |
| 5,179,686 | 1/1993 | White | 395/497.03 |
| 5,465,342 | 11/1995 | Walsh | 394/446 |
| 5,497,458 | 3/1996 | Finch et al. | 395/183.06 |
| 5,502,833 | 3/1996 | Byrn et al. | 395/459 |
| 5,511,180 | 4/1996 | Schieve | 395/497.03 |
| 5,515,521 | 5/1996 | Whitted, III et al. | 395/403 |
| 5,581,730 | 12/1996 | Silla | 395/471 |

OTHER PUBLICATIONS

IBM Technical Disclosure Bulletin, Apr. 1995, NN9504183, "Dynamic Memory Size Determination Algorithm".
McVoy and Staelin, "Lmbench: Portable Tools For Performance Analysis", 1996.
Patterson, David A. and Hennessy, John L. "Computer Organization & Design—The Hardware/Software Interface" 1994, pp. 458–469 and 501–514.

*Primary Examiner*—Eddie P. Chan
*Assistant Examiner*—Gary J. Portka
*Attorney, Agent, or Firm*—Blakely, Sokoloff, Taylor & Zafman LLP

[57] ABSTRACT

An automatic method and apparatus in a computer system of cache detection. Accessing of data stored at first specified boundaries in a memory of the computer system corresponding with a first size of a cache is timed to produce a first timing value. Accessing of data stored at second specified boundaries in the memory of the computer system corresponding with a second size of a cache which is greater than the first size is timed to produce a second timing value. If the second timing value exceeds the first timing value by a threshold then the presence of a cache of the first size is indicated. This can also be performed iteratively until the memory of computer system has been completely tested for the presence of any caches. The process may be performed for instruction or data caches wherein the accessing of data for data caches includes memory access instruction, and the accessing of data for instruction caches includes the execution of instructions. Methods and apparatus for determining other cache characteristics are also described including detecting the set associativity of any known caches, and whether the known data and instruction caches are unified or not.

27 Claims, 22 Drawing Sheets

100

| 330 → | TYPE | SIZE | S/A | Instruction Loop Time | No. of Instr. Loops | Data Loop Time | No. of Data Loops |
|---|---|---|---|---|---|---|---|
| | 331 | 332 | 333 | 334 | 335 | 336 | 337 |
Fig. 3c
Instruction Cache Array
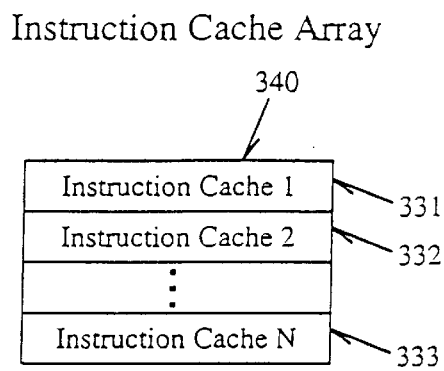
Fig. 3d
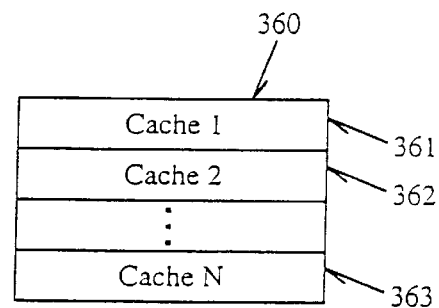
Fig. 3f
Data Cache Array
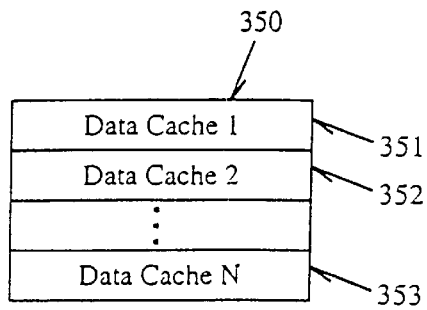
Fig. 3e

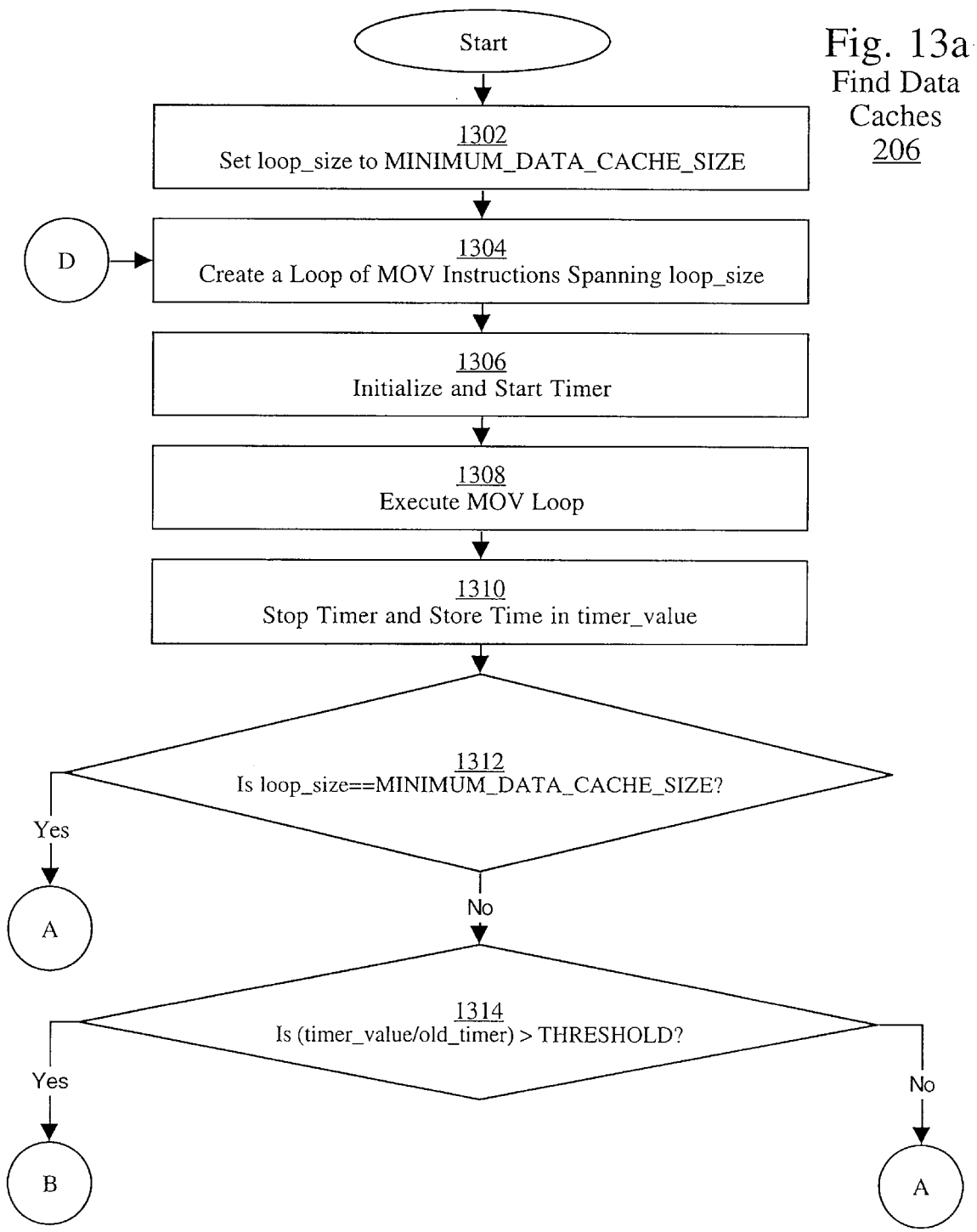

206

Data Loops

CACHE DETECTION USING TIMING DIFFERENCES

BACKGROUND OF THE INVENTION

1. Field of the Invention

The present invention relates to caches in computer systems. More specifically, the present invention relates to a method and apparatus which detects the presence of a cache and, if any is present, the characteristics of the cache.

2. Background Information

As part of the normal self-test routine of a computer system, the presence and validity of a cache contained within the system is normally performed. Cache memory in different computer systems varies widely from system to system. Different chipsets report different cache sizes differently. Prior art methods of determining cache size have been limited to programs specific to particular chipsets that query the chipset for the cache size information. That is, a different program needs to be written for each different chipset.

Cache size and characteristics have been set in many previous environments via the use of jumper settings or other hardware configurations on a computer system motherboard. If the hardware configuration does not correspond with the resources in the system, however, the cache size and type will be reported incorrectly.

Prior art techniques have also been lacking in determining specific characteristics of caches, such as multi-levels of caches. Techniques which can apply to any computer system are lacking which allow the determination of the set-associativity of a cache. Lastly, the prior art lacks a generalized method for determining whether data and instruction caches are unified.

Thus, one prior art need is a single methodology which would detect the presence and size of caches in a variety of computer system architectures with different chipsets. In addition to size and presence of a cache, type (e.g., instruction, data, or unified cache) and set associativity of caches as well may be required to be determined. Also, multiple levels of caches should be able to be determined using a single technique applicable across a wide variety of computer system chipsets and computer system architectures to avoid the deficiencies of the prior art.

SUMMARY OF THE INVENTION

An automatic method and apparatus in a computer system of cache detection. Accessing of data stored at first specified boundaries in a memory of the computer system corresponding with a first size of a cache is timed to produce a first timing value. Accessing of data stored at second specified boundaries in the memory of the computer system corresponding with a second size of a cache which is greater than the first size is timed to produce a second timing value. If the second timing value exceeds the first timing value by a threshold then the presence of a cache of the first size is indicated. This can also be performed iteratively until the memory of computer system has been completely tested for the presence of any caches. The process may be performed for instruction or data caches wherein the accessing of data for data caches includes memory access instruction, and the accessing of data for instruction caches includes the execution of instructions.

An automatic method and apparatus in a computer system for determining the associativity of a cache having a first size. Data at first specified boundaries in computer system memory corresponding with a first possible associativity of the cache is accessed and timed to produce a first timing value. The first timing value is compared with a known access time of the cache, and if the first timing value is within a threshold of the known access time then the associativity of the cache is indicated as equal to the first possible associativity. This may be performed iteratively, on each iteration, reducing the first possible associativity until the first timing value is within the threshold of the known access time or the first possible associativity is direct-mapped.

An automatic method and apparatus for determining whether an instruction cache and a data cache are unified. The execution of instructions at first specified boundaries corresponding with a first size of the instruction cache in a first location in a memory of the computer system and the accessing of data at second specified boundaries corresponding with the first size of the data cache in a second location in the memory of the computer system, wherein the second location in the memory of the computer system is adjacent to the first location is timed to produce a first timing value. The first timing value is compared with a known access time of the first and second caches, and if the first timing value is within the known timing value by a threshold then indicating that the data cache and the instruction cache are unified.

BRIEF DESCRIPTION OF THE DRAWINGS

The present invention is illustrated by way of example and not limitation in the figures of the accompanying in which like references indicate like elements and in which:

FIGS. 3c–3f show structures stored in volatile or non-volatile memory for storing the size and characteristics of detected caches in a computer system.

FIGS. 13a and 13b show the process performed for determining the presence and size of data caches.

DETAILED DESCRIPTION

The present invention is directed toward a method and apparatus which detects the presence and characteristics of caches in a computer system. Specifically, the present invention will detect the size, location, and set associativity of caches in a computer system. The process will also determine whether an instruction and data cache in a system are unified. Although certain specific embodiments will be described, it can be appreciated by one skilled in the art that these are for illustration purposes only, and do not limit the scope of the present invention. Modifications on the specific teachings of this application can be made by one skilled in the art, without departing from the overall spirit and scope of the present invention.

Figure 1:
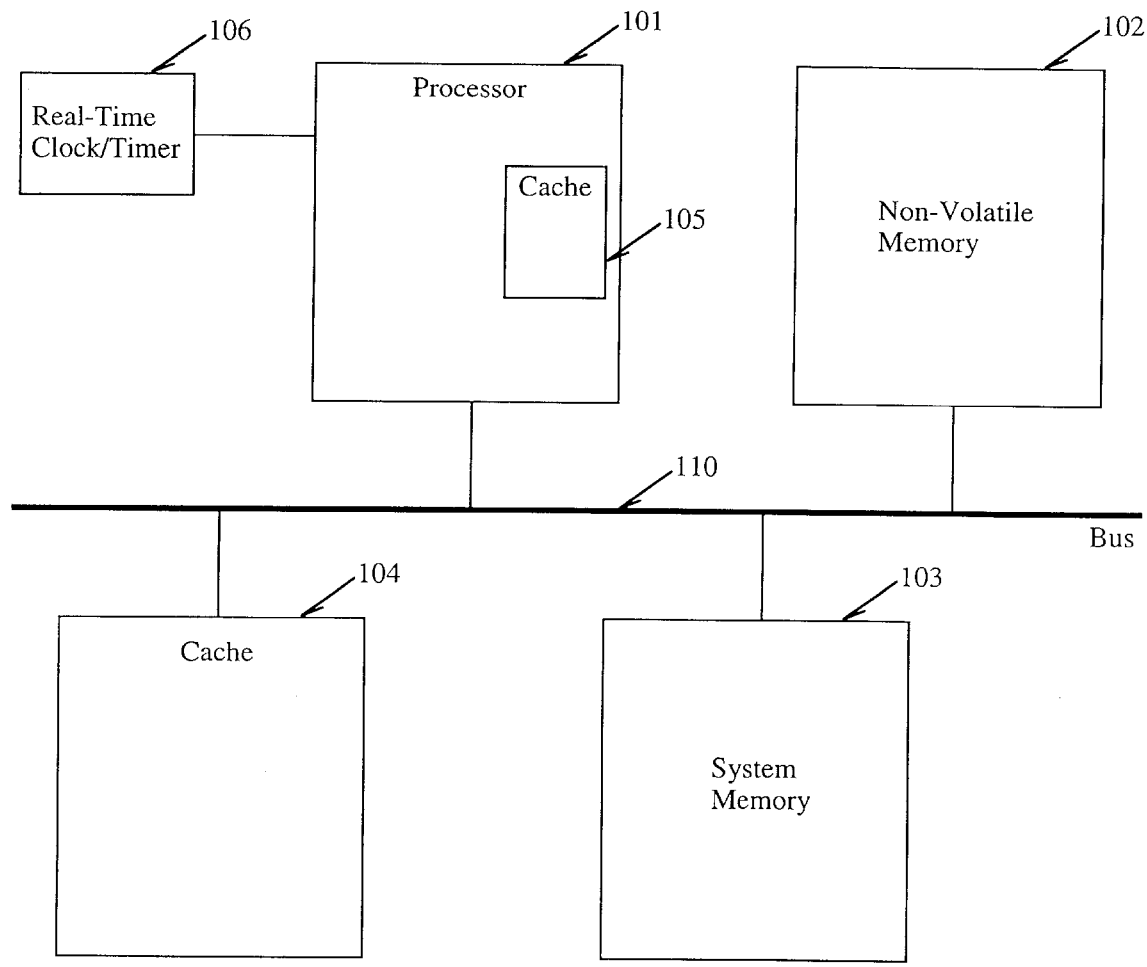
FIG. 1 shows a block diagram of a system in which embodiments of the present invention may be implemented.

FIG. 1 illustrates a system in which various embodiments described here may be implemented. Note that although certain of the following will be directed towards methods which are implemented in a general-purpose programmed computer system programmed to perform the recited functions, these methods may also be practiced by special-purpose hardware which performs the recited function at specified times (e.g., computer system initialization or boot-time). Other implementations of the described techniques may also be made.

An example computer system in which embodiments of the present invention may be implemented is shown as 100 in FIG. 1. 100 includes a central processing unit or processor 101 which is coupled to various other components in the system via a bus 110. The system may include a non-volatile memory 102 such as a PROM, EEPROM (electrically erasable programmable read-only memory), or other non-volatile storage means. Included in this non-volatile memory may be some of the basic input/output operating routines (BIOS), and/or the automatic cache detection algorithms described herein. Such routines may be loaded into a portion of system memory 103 from non-volatile memory 102 or disk during computer system boot-time or other intervals for execution of certain system routines, and/or test routines. System memory 102 also serves for normal storage and execution means during computer system run-time. In certain system architectures, system memory 103 may include so-called "conventional" and "high" memory and, in addition, so-called "extended" memory in the IBM Personal Computer PC/AT type architecture. Also coupled to bus 110 is a cache 104. Cache 104 may serve the function of providing caching of accesses to and from system memory 103 and processor 101. Cache memory 104 may be a level 1 (L1) or a level 2 (L2) cache, according to implementation. For example, if processor 101 contains an internal cache such as 105 illustrated in FIG. 1, then 104 can be an L2 cache. The system may also include any number of caches of different sizes at different hierarchical levels according to implementation. Each cache in the system includes its associated stored cache tag for maintaining coherency and other relevant information. Finally, processor 101 may be coupled to a real-time clock/timer 106 for timing of the accesses to system memory to be described here.

In one embodiment, system 100 is one of the IBM PC/AT-compatible type personal computers such as the Gateway brand personal computer manufactured by Gateway 2000 Computer Systems. Processor 101 may be one of the Pentium® brand microprocessors available from Intel Corporation of Santa Clara, Calif. (Pentium and Intel are trademarks of Intel Corporation).

Figure 2:
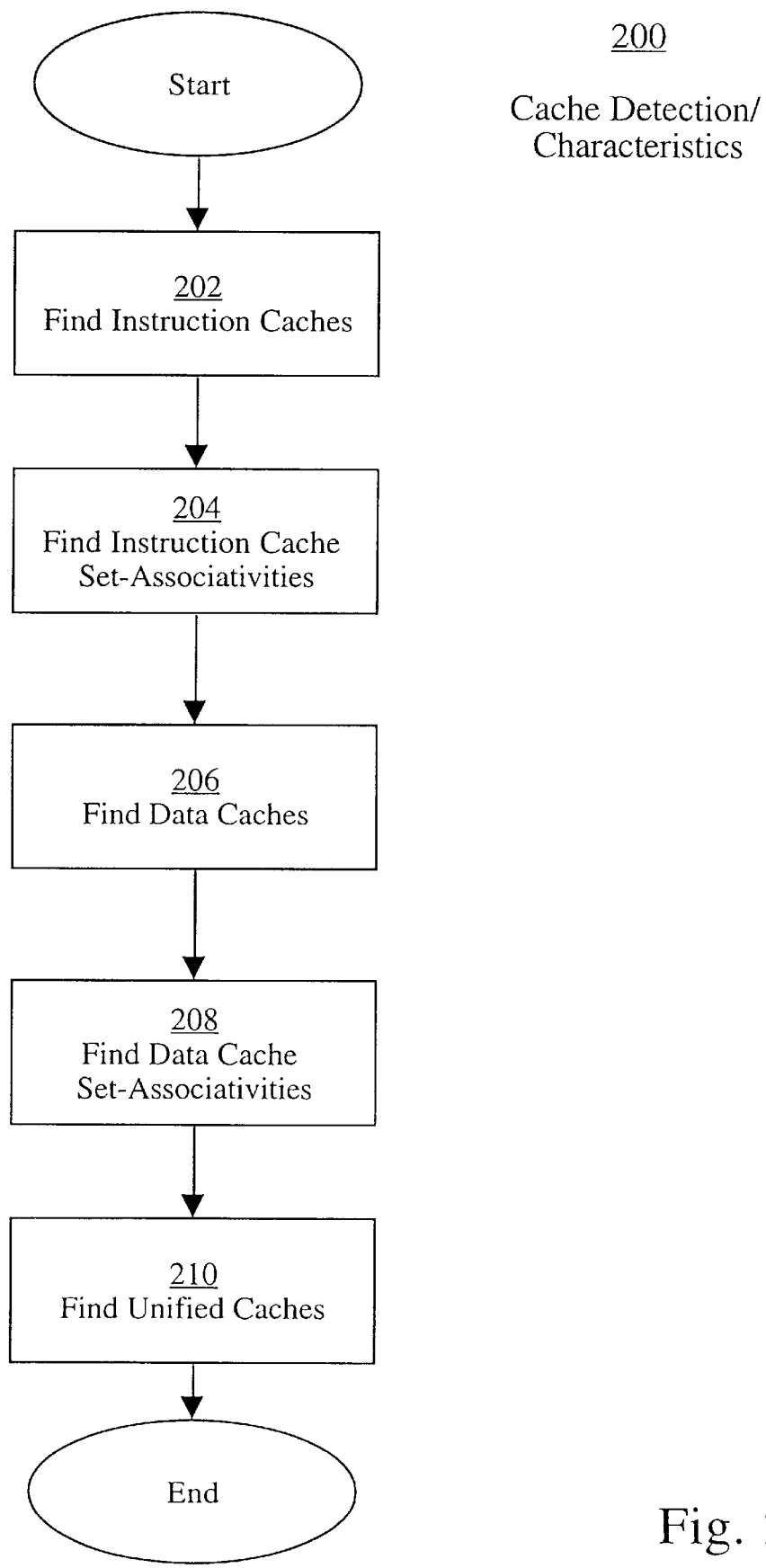
FIG. 2 shows a main loop of a process for determining the size and characteristics of caches in a computer system.

As shown in FIG. 2, the cache detection characteristics process is shown as 200 in FIG. 2. As shown, the method comprises 3 main functions:

1. instruction cache detection and characteristics processes 202 and 204;

2. data cache detection and characteristics processes 206 and 208; and 3. a unified cache detection process 210.

Once caches have been found (e.g., steps 202 or 206), then associated cache associativity detection processes are invoked (204 and 208) to determine the associativities of the caches. The unified cache function 210 is called last to determine whether any instruction/data cache pairs are actually a single unified cache for both data and instructions.

Implemented embodiments of the present invention exploit characteristics common to all caches in order to detect the presence, location, and characteristics of caches. Memory accesses are fastest when data that the CPU requests exists in the cache (a cache hit) and slowest when the data does not exist in the cache (a cache miss). In summary, this method performs a series of cache access sequences and times how long each sequence of access takes by using a constant-speed timer coupled to the central processing unit 101 such as a PIT (program interval timer) 106. For example, this timer may include the Intel 8254 Timer/Controller available from Intel Corporation of Santa Clara, Calif. This also may include any constant speed timer in an ASIC in certain computer systems. In order to determine if a cache of a certain size exists, a sequence of cache accesses are performed at first specified boundaries designed to cause nearly all accesses to the cache to hit. This sequence of accesses is then followed by a second sequence of accesses at second specified boundaries designed to cause all the accesses to the cache to miss. Thus, the first sequence should take a shorter period of time relative to the second. If the first sequence is significantly faster than the second access sequence, according to some threshold, then a cache exists of the size being tested for. If the two access sequences take approximately the same amount of time (within the threshold), then no cache of the size being tested for exists. By performing pairs of timed access sequences for every possible cache size for the system (by powers of 2), caches in the system can be detected. The current implementation searches for caches starting at 1 kilobyte, and continues to half of the total system memory.

Cache Size Determination

Figure 3A:
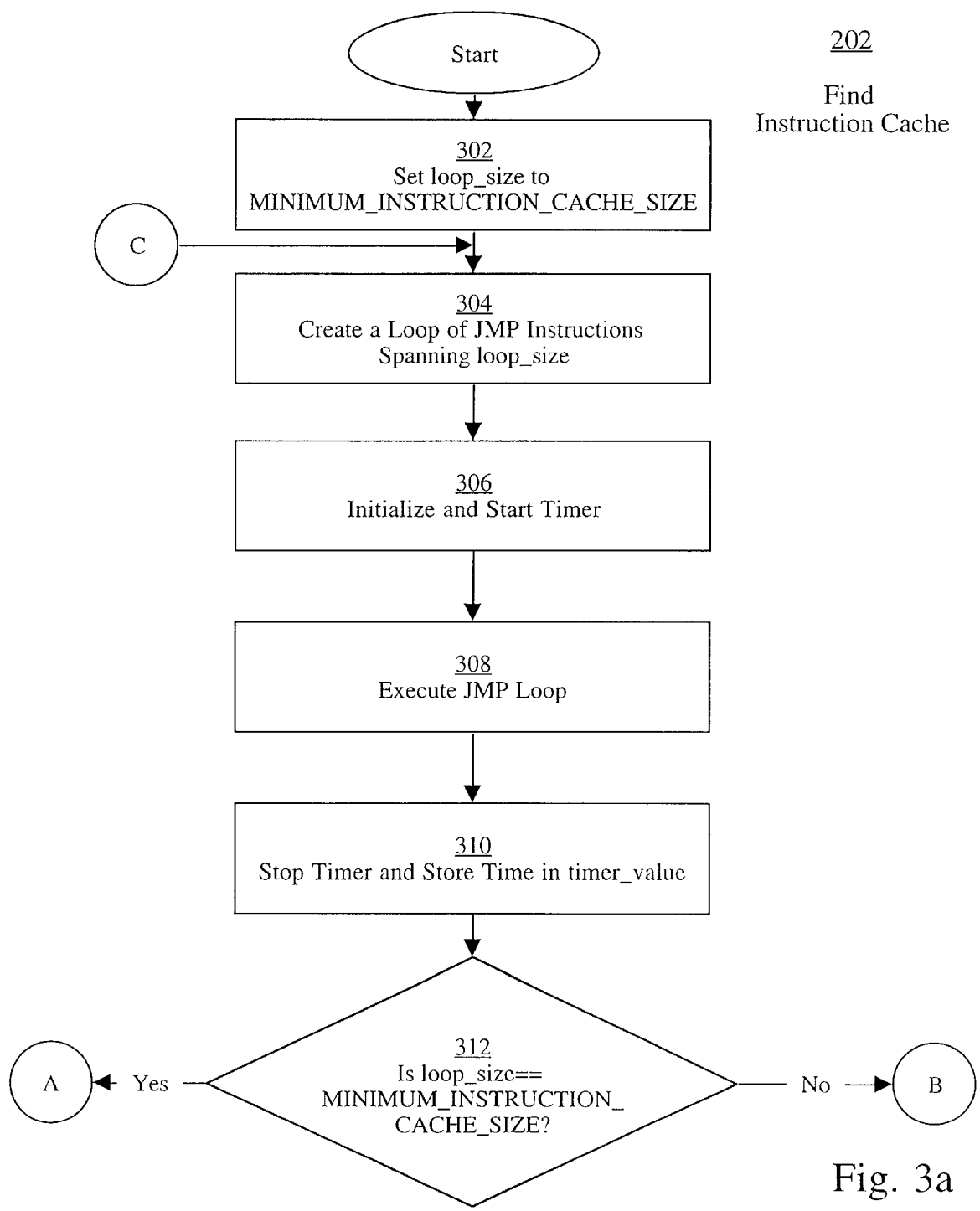
FIGS. 3a and 3b show the method steps performed for determining the presence and size of instruction caches.
Figure 3B:
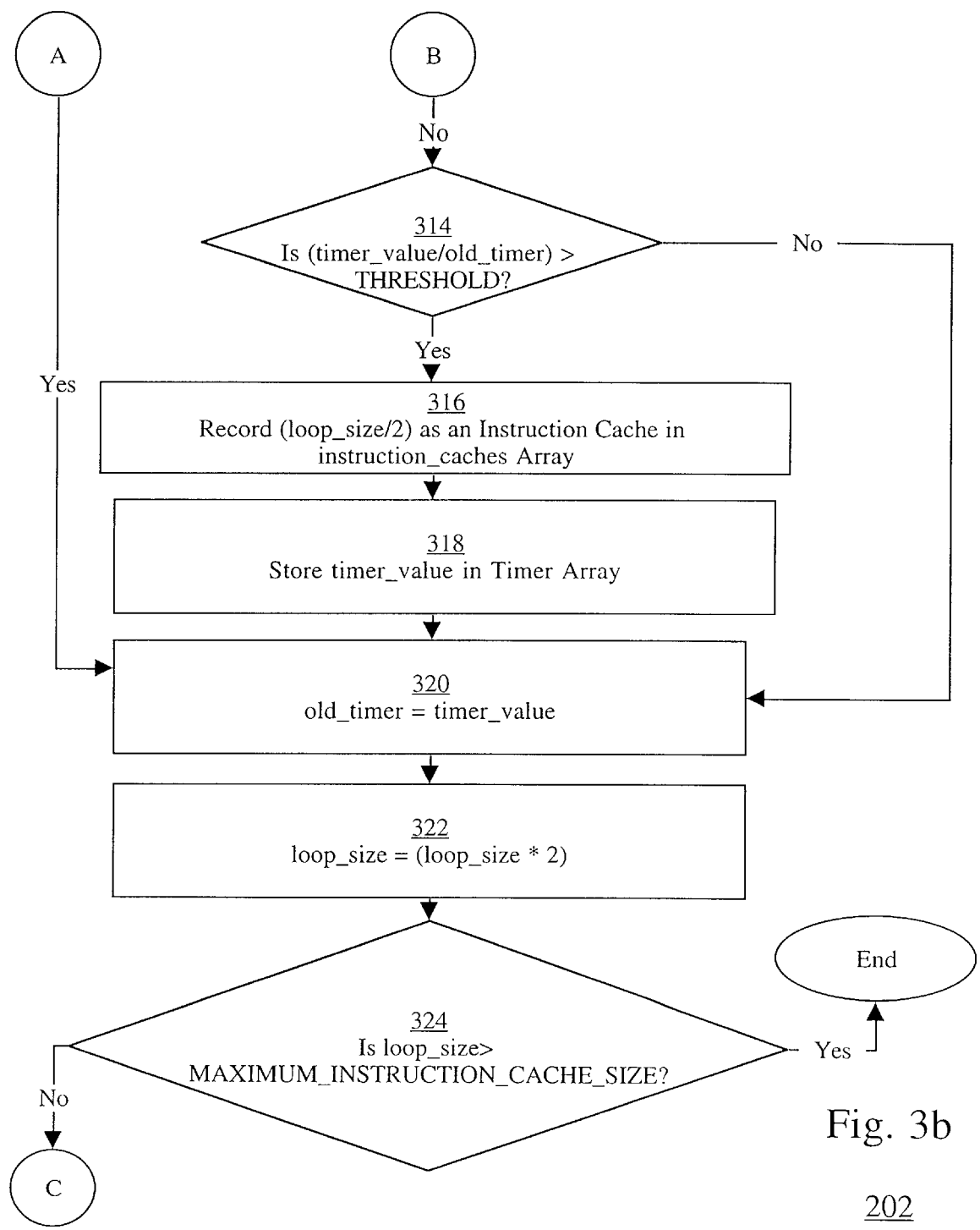

The process performed for determining the presence and size of an instruction cache is shown in FIGS. 3a and 3b. As shown in FIG. 3a, the first step 302 in the process is to set the initial loop size being tested for to the minimum instruction cache size. In implementations of the present invention, the minimum instruction cache size being tested for is 1 kilobyte. For example, first a 1 kilobyte cache size is tested for such as 501 shown in FIG. 5. Subsequent thereto, a 2 kilobyte cache 502 is tested for. Subsequent thereto, the next cache size (4 kilobytes) 503 is tested for. This process continues iteratively until half of the system memory 504 has been tested for the presence of a cache.

Figures 6, 7:
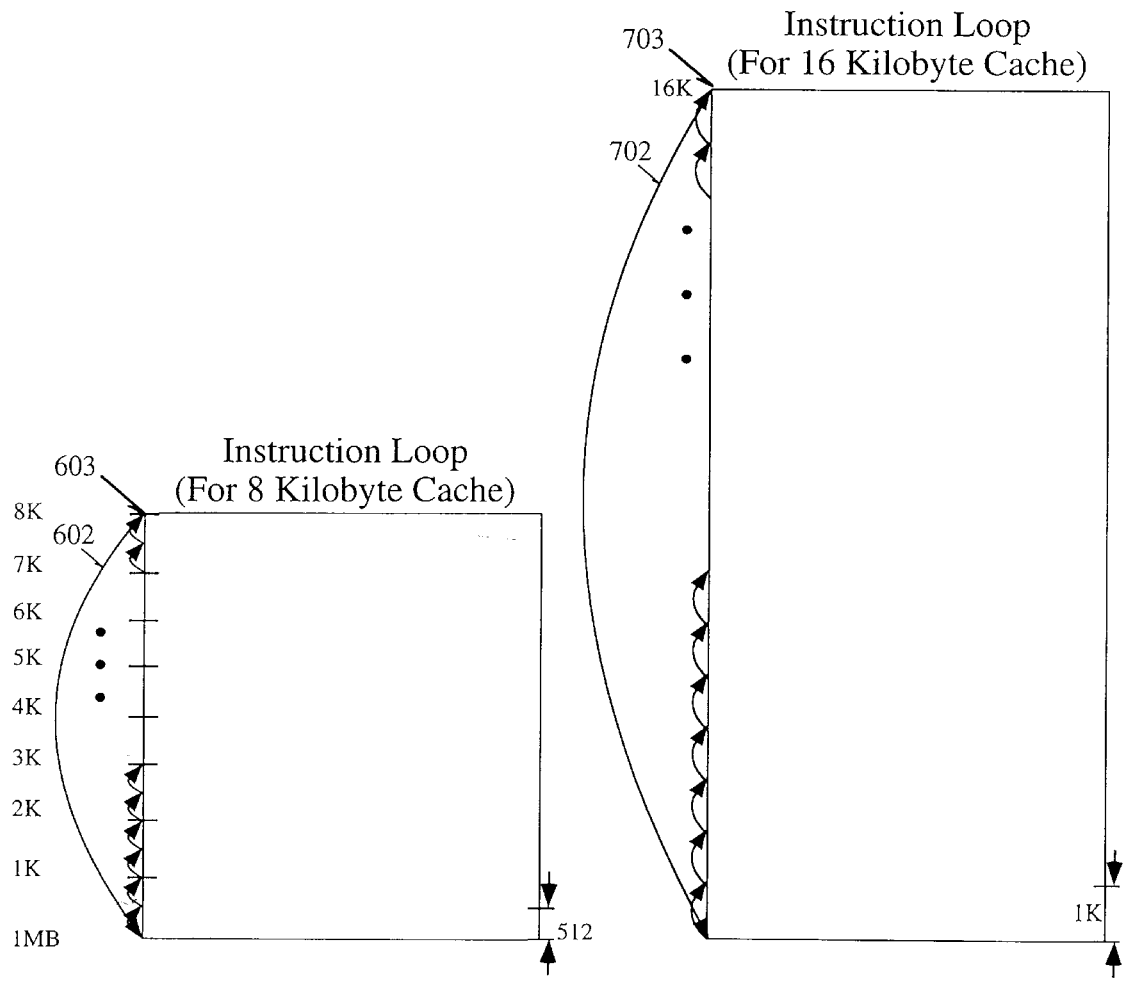
FIGS. 6 and 7 show the storing of instructions for two iterations of the instruction cache detection loop.

Once the loop size has been set at step 302, then at step 304, a loop of jump (JMP) instructions spanning the loop size is created at first predetermined boundaries. That is, since this is an instruction cache detection process, the method uses JMP instructions equally spaced within the minimum instruction cache size in order to determine the presence of the cache. As will be shown below, the data cache test creates a loop of memory access instructions (MOV's) which perform a similar function for data caches. Note that the loop of jump instructions which spans the loop size set at step 304 places the JMP instructions at locations corresponding with predetermined boundaries within system memory in order to cause subsequent accesses to the locations in the instruction cache to be cache hits. For the purposes of this embodiment, a maximum possible set associativity of the cache is assumed. Thus, assuming a maximum 8-way set associativity of the instruction cache, the accesses are spaced 1/16 of the total cache size apart (1/(2* max_possible set associativity)). As illustrated in FIG. 6, JMP instructions are therefore placed at 512 byte intervals to have 16 equidistantly-spaced JMP instructions contained within an 8 kilobyte range of memory in order to test for the presence of an 8 kilobyte cache. Note that this 8 kilobyte range may be anywhere in memory, in typical computer systems. For the purposes of implementation, however, JMP instructions are placed at 512 byte intervals, starting at 1 megabyte in the "extended" portion of the computer system's memory. This is to avoid any contention issues with other processes and/or device drivers in certain architectures, such as the IBM PC/AT, which treats "conventional," "high," and "extended" memories differently. By limiting the test to extended memory, no such issues arise.

Assuming that there are 16 accesses for twice the maximum possible set associativity of the cache, as shown in FIG. 6, a total of 16 jump instructions 602 are stored within main memory. Also, the final instruction 603 stored at the last location in the 8 kilobyte range of the memory contains a JMP instruction back to the beginning of the cache range being tested for. In order to execute the inner loop multiple times (in order to provide an accurate average timing reference for cache hits), the first two instructions stored starting at the 1 megabyte boundary include a decrement (e.g., DEC) and jump not zero (e.g., JNZ in the X086 family instruction set) machine language instructions in order to execute the inner loop (instruction loop) a specified number of times. This is to allow the first iteration of the jump loop to load the cache lines (resulting in cache misses), and subsequent accesses to cause cache hits to the loaded cache lines, if the cache is the tested-for size. Sufficient iterations of the loop are executed in order to generate a timing reference which is generated from cache hits predominantly (if the cache exists), so that subsequent accesses can be tested for cache misses. The inner loop ends when the counter is equal to zero.

Once the loop of jump instructions spanning the loop_size at the specified boundaries (512 byte boundaries for the 8 kilobyte cache) has been created as shown at step 304, then any other initializations are performed such as the setting of the number of iterations of the execution loop that shall be performed, and the timer is started at step 306. The PIT timer is used for timing the execution of the jump loop 602 shown in FIG. 6. At step 308, the jump loop is then executed the specified number of times according to the number of iterations set in the counter at step 306. A more detailed view of the execution of the jump loop is shown in FIG. 4.

Figure 4:
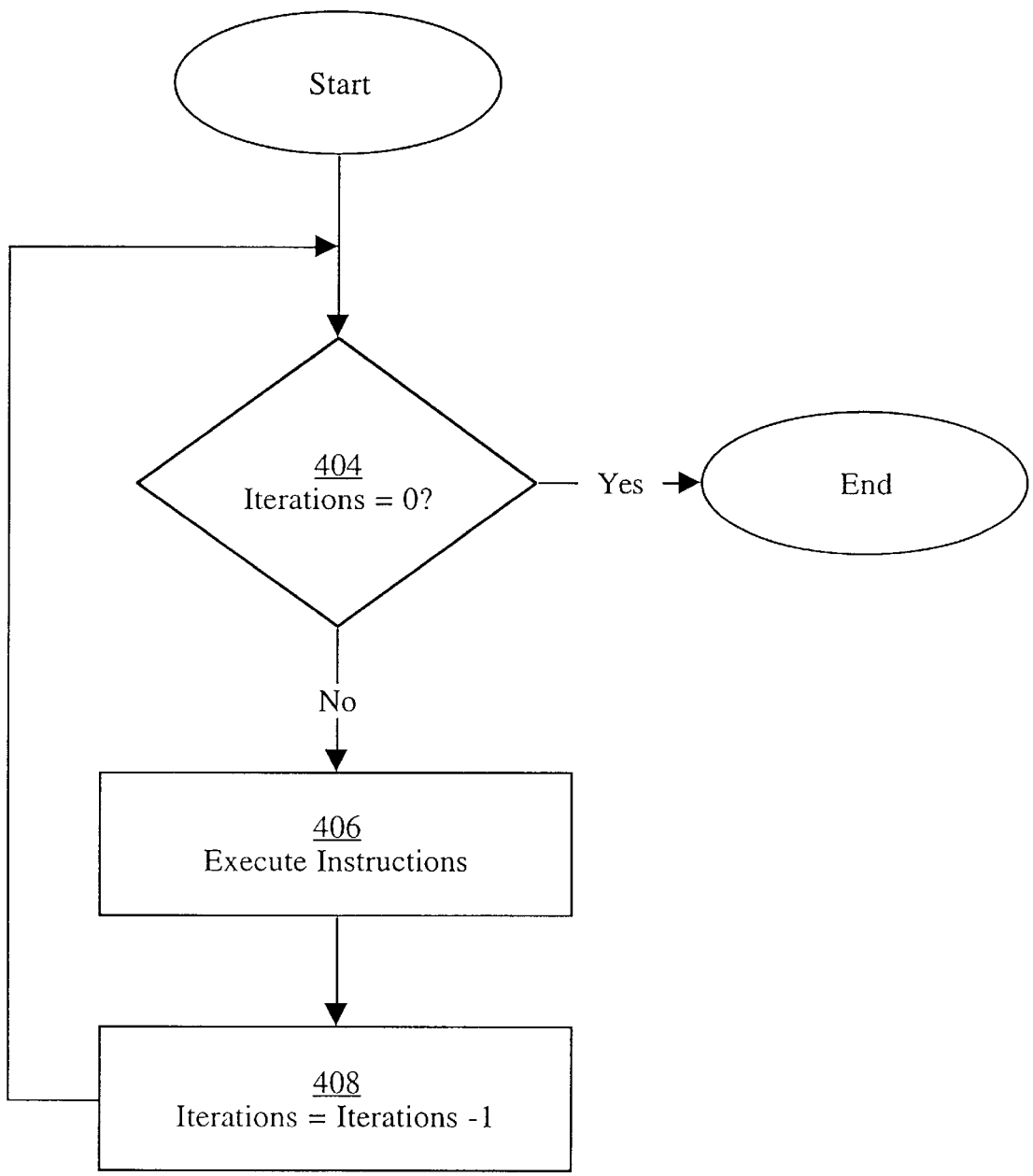
FIG. 4 shows the performance of the inner loop for the execution of instructions using the described embodiments.

FIG. 4 briefly illustrates the process for executing the jump loop (e.g., 602 of FIG. 6) for the tested-for cache size. The number of iterations is set in a register or other means at step 306 shown in FIG. 3a. This is set to some maximum iterations figure which varies according to implementation, depending on the clock speed of the processor, and the granularity of the attached timer. The maximum number of iterations figure is constant for the testing of all the different cache sizes in order to provide a constant timing reference. At step 404, it is determined whether the number iterations has equaled 0 (e.g., a JNZ instruction). Because the iterations counter is decremented on each execution of the jump loop (step 408), the process exits when it reaches zero, as detected at step 404. If the iterations counter has not yet reached zero, as detected at step 404, then the JMP instructions continue to execute at step 406. Upon execution of all the jump instructions in the tested-for cache range, the number of iterations is decremented at step 408, and the loop continues until the iteration counter reaches zero, as detected at step 404.

Once the requisite number of iterations in the jump loop have been executed at step 308 the timer is then stopped and stored in a variable timer_value at step 310 as shown in FIG. 3a. Once the initial timing reference has been ascertained, at step 310, a test is done at step 312 to determine whether this pass is the initial pass through the instruction cache detection process. If so, then any testing to determine whether timer_value has increased by a threshold amount (step 314) from the old_timer value and recording of the presence of a cache and associated timer_value (steps 316–318) are skipped. If so, then the process proceeds to step 320 of FIG. 3b. If not, however, then the process proceeds to step 314 of FIG. 3b.

Step 314 of FIG. 3b determines whether the ratio of timer_value over the old_timer value has exceeded the threshold. In implemented embodiments of the present invention, the threshold value is equal to 1.3, requiring a 30% difference between the current timer_value and the old_timer value to detect the presence of a cache. Of course, this threshold value may be different values according to implementation. Thus, if the timer value has exceeded the old_timer by the threshold amount (30% in these implementations), then half of the loop size is recorded as the size of an instruction cache in an array at step 316. This array, as discussed below, is also used for storing other characteristics including set associativity, and other characteristics of caches. That is, a cache of the size of half the loop size has been detected. 330 of FIG. 3c illustrates an example of an entry in an instruction cache array.

At step 318, the timer value is then stored in a timer array which, in this embodiment, is a field 334 in the instruction cache array entry 330 of FIG. 3c. This is to retain the characteristics of each detected cache for the next iteration of the process. Then, at step 320, the old_timer value is set equal to the currently determined timer_value for the next iteration of the outer loop to determine the next cache size. At step 322, the loop size is then increased by a factor of 2. At step 324, it is determined whether the loop size has exceeded the maximum_instruction_cache_size. As previously discussed, in implemented embodiments, the maximum instruction cache size is half of system memory. If the loop size has not yet reached the maximum_instruction_cache_size, as detected at step 324, then the process repeats, returning to step 304 of FIG. 3a to continue the next iteration of the loop. Then, upon subsequent iterations of the loop, the timer_value and the old_timer are compared at step 314, detecting caches throughout the memory range of the system, according to their timing differences of accesses between loop sizes.

Once sizes of the caches, if any, have been determined, cache characteristic information is stored into an array. This includes the measured timer value and size. In implementations, upon initial determination of the presence of a cache, separate arrays 340 and 350 as shown in FIGS. 3d and 3e are used for storing instruction and data cache characteristic information. Once all data and instruction caches have been found, when unified caches are located, entries for both data and instruction caches are merged into a single entry. Remaining entries for both instruction and data caches are then merged into a single array 360 as shown in FIG. 3f with the unified entries, with separate entries 361–363 for instruction, data, and unified caches. Each entry in the arrays has the format shown in FIG. 3c.

Array entry 330 in FIG. 3c has several fields 331–337 for retaining the characteristics of a cache. Arrays comprising entries such as 330 are stored in volatile memory for the duration of the processes to be described here, but may be stored to disk or other non-volatile memory means (e.g., EEPROM) after the processes are complete. Each entry 330 includes a type field 331 which indicates whether the cache is data, instruction or unified (e.g. by 3 different integer values). A size field 332 contains the size, in bytes, of the cache. Field 333 contains the set-associativity of the cache, determined using the methods described below. Fields 334 and 336 contain the timer values for instruction and data caches, respectively. Fields 335 and 337 contain the corresponding number of instructions (outer loop) executed during the timing of the memory accesses for scaling of the timer values, if required.

Figure 5:
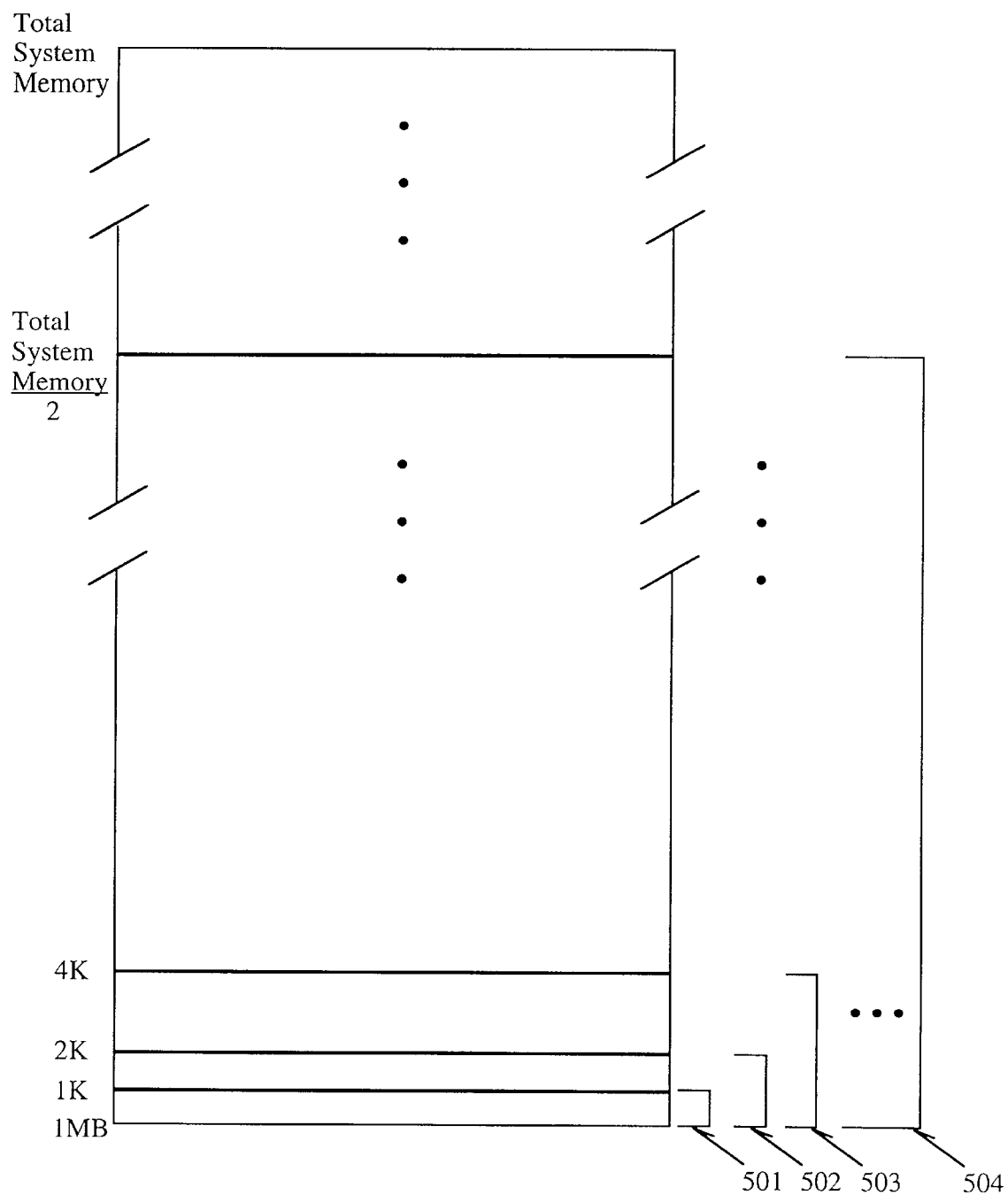
FIG. 5 shows how the detection of caches progresses through computer system memory.

FIGS. 6 and 7 show two sequences of instructions stored in system memory to determine the presence of a cache. For example, upon an iteration of the loop in process 202 to check for an 8 kilobyte cache, the 16 JMP statements at 512 byte boundaries may be stored from the 1 megabyte boundary up to 1 megabyte+8 kilobyte location to detect the presence of a cache having a size of 8 kilobytes. Subsequent thereto, upon a second iteration of the steps 304–310 shown in FIG. 3a, the JMP loop shown as 702 in FIG. 7 can be stored, wherein 16 separate jump statements are stored at one kilobyte intervals, starting at 1 megabyte. If a timing difference of 30% or greater for executing the loop formed by 702 of FIG. 7 than the time to execute the loop 602 shown in FIG. 6, then, a cache size of 8 kilobytes has been detected. This fact is then recorded in the instruction cache array 340 of FIG. 3d. The pattern for the detection of caches in the system continues until (system memory)/2 has been tested for the presence of a cache as shown in FIG. 5. Note that the number of jump instructions in the loop is determined based upon the maximum possible set associativity of the cache. Implemented embodiments of the present invention use 16 separate accesses within the cache's range in order to compensate for an 8-way possible set-associative cache. Of course, the number of stored instructions, and thus the number of accesses performed during the timing loop may vary according to implementation, according to the maximum possible set associativity desired. The spacing of the statements stored into memory, as shown in FIGS. 6 and 7, is $$\frac{\text{cache size}}{(\text{max associativity} * 2)}.$$

Instruction Cache Set Associativity Detection

Figure 8A:
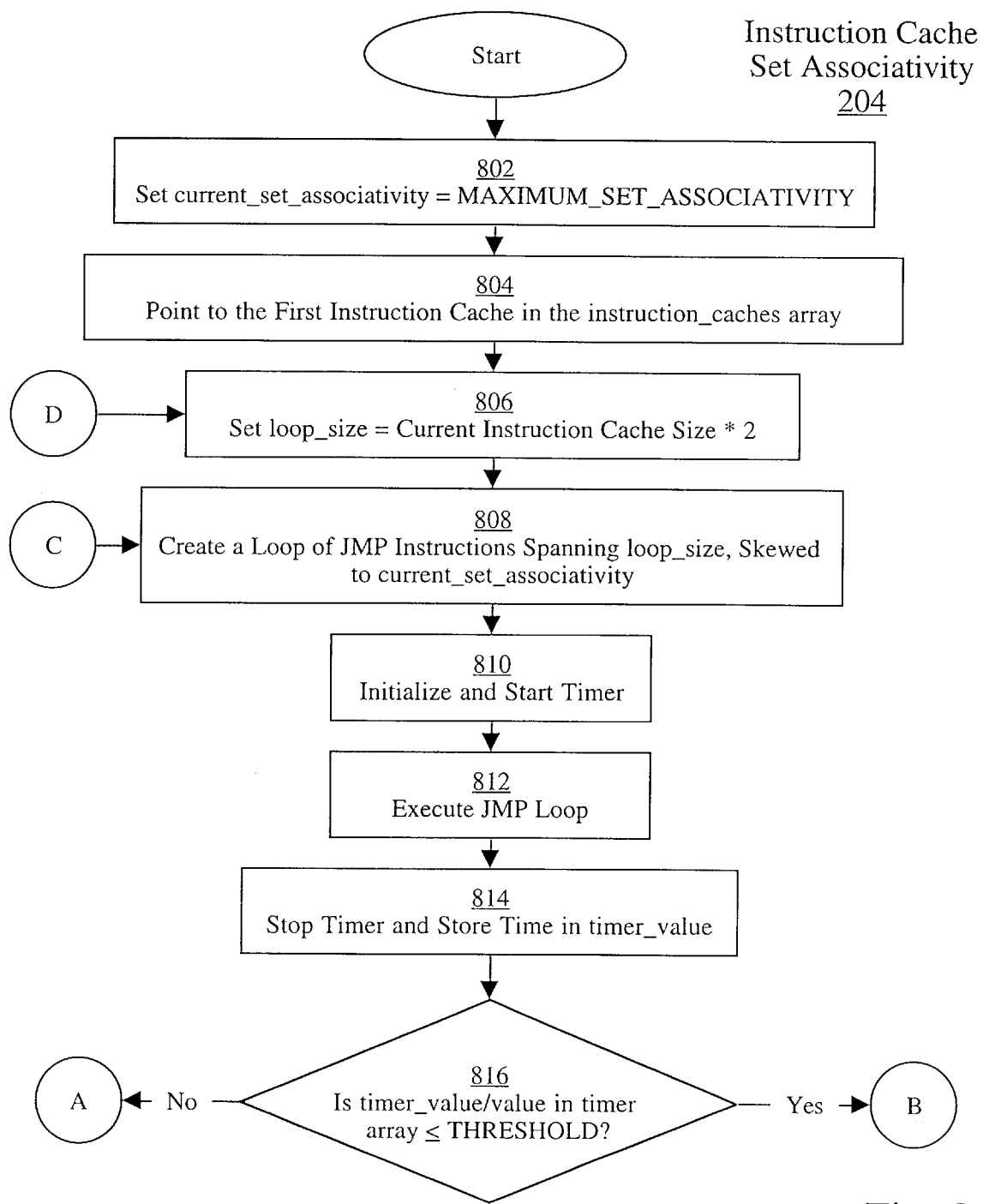
FIGS. 8a and 8b show the process performed for determining set associativity of an instruction cache.
Figure 8B:
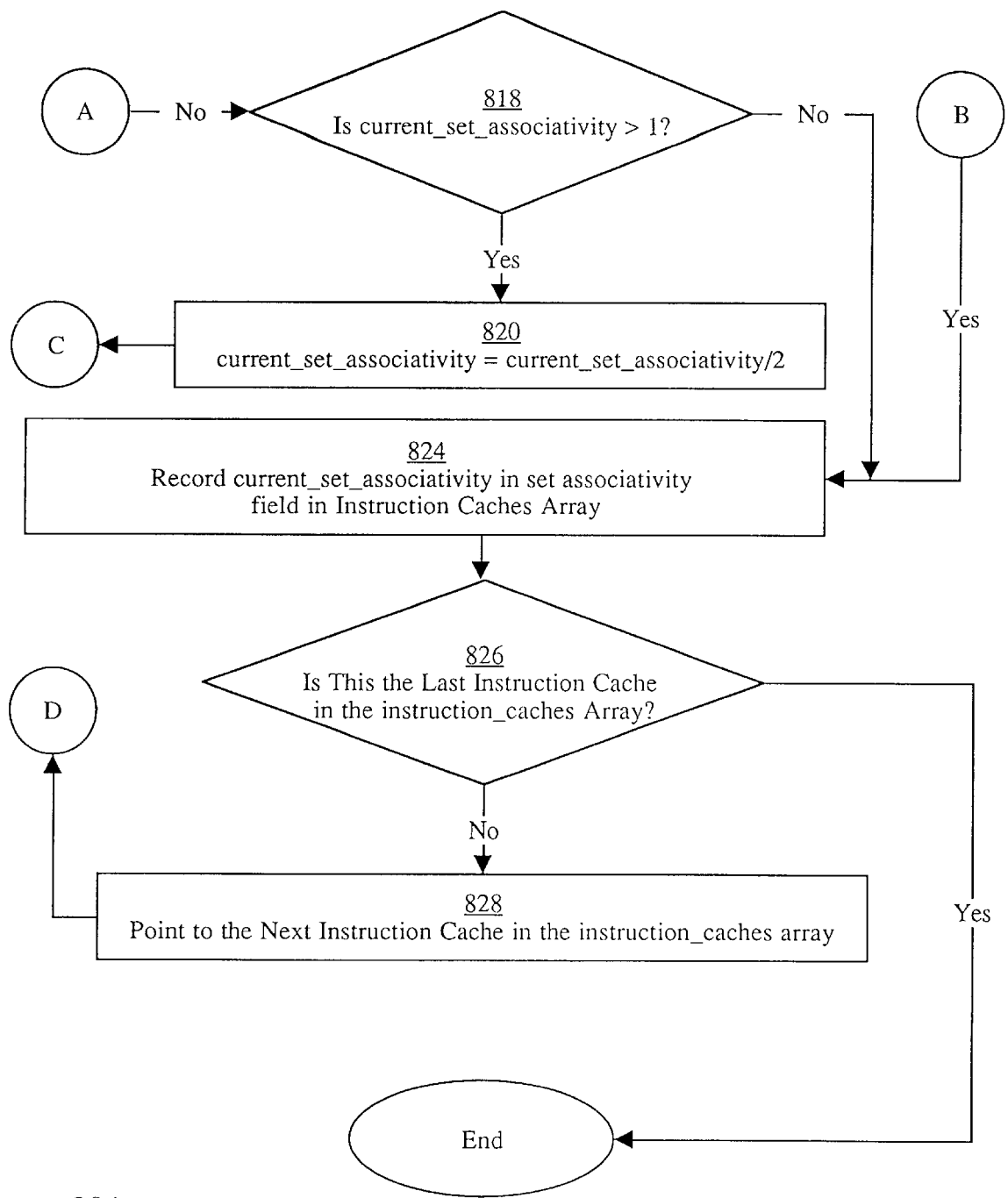
Figure 9:
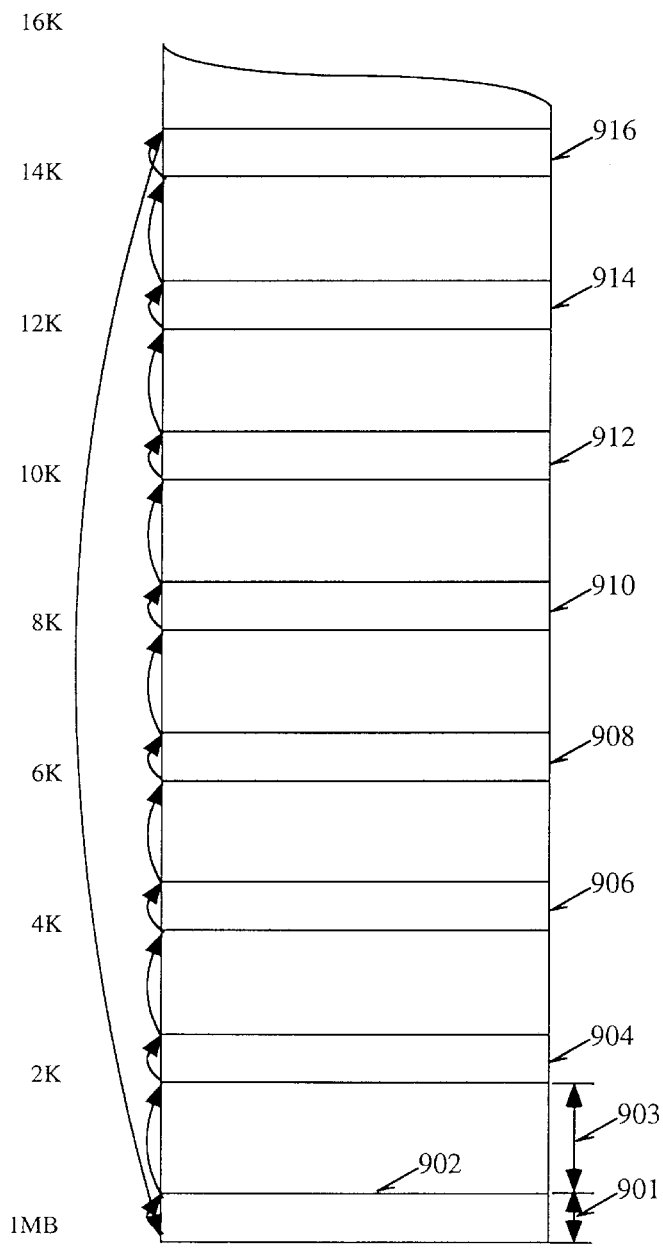
FIGS. 9–12 show the storage of instructions in memory to determine set associativities of an instruction cache.

Once the size of the instruction cache(s) has been determined, (e.g., via process 202 of FIGS. 2, 3a, and 3b), if any, the set associativity of a cache having a known size can be determined. The size can be determined using process 202 above. This process is shown in detail in FIGS. 8a and 8b. Process 204, as shown in FIG. 8a, starts by setting the current set associativity equal to a maximum possible set associativity of the computer system at step 802. At step 804, the first instruction cache in the instruction caches array (e.g., 330 of FIG. 3c) is pointed to, and at step 806 the loop size is set equal to double the current instruction cache size being tested for. Thus, to determine the set associativity of an instruction cache of 8 kilobytes, a loop size of 16 kilobytes is generated. This is shown in FIG. 9. Then, at step 808, a loop of jump instructions spanning loop size skewed to the current set associativity is created at step 808. In order to detect a cache having a set associativity of 4, for an 8 kilobyte cache, the cache is treated as though divided into 8 separate 2 kilobyte caches (to cause all cache misses since 8 sets is greater than the 4-way set-associative data cache being tested for). The 16 accesses are thus distributed throughout the 16 kilobyte range. 8 partitions distributed over a memory space twice the instruction cache size, is first performed in order to detect a performance increase to detect the actual set associativity of the cache. Thus, to determine a set associativity of the cache, accesses divided into 8 groups are seeded into memory in order to detect a 4-way set associative cache. Thus, memory is divided in to 8 equal portions wherein 8 groups of 2 memory accesses shown as 902–916 in FIG. 9 are stored, in current implementations.

As shown in FIG. 9, the accesses are spaced corresponding to the possible set associative boundaries of the cache. This value between accesses is the value minimum_space which is (cache size)/16 accesses=512 bytes. Since this is a 4-way set-associative cache being tested for, 8 groups of the 16 accesses are created, or two per possible set. The value minor_num. which is the number of spaces between accesses per set are in the first iteration of this example:

minor num=((Max_set_associativity*2)/set_associativity)−1

=((8*2)/8)−1

=1.

The last access to a set is then spaced major_space apart from the access for the next set wherein:

major_space=((loop size/current set associativity)−(minor_num*minimum_space))

=((16384/8)−(512*1))

=2048−512

=1536.

As shown in FIG. 9, minimum_space is illustrated as the space 901 between accesses, and major_space is illustrated as distance 903 between the last access in a set and the first access for the next set.

In summary for this first iteration, two accesses spaced 512 bytes apart are placed starting at the 1 megabyte boundary 902, two accesses starting at the 2 kilobyte boundary 904 are stored spaced 512 bytes apart, and this loop continues for each of groups 906–916. In the examples shown in FIGS. 9–12, the stored data includes JMP instructions to be executed, however, as will be discussed below, for determination of a data cache, the corresponding memory access instructions are stored (e.g., MOV's). Because the first measured timer_value will be for a set associativity beyond the maximum, the accesses should result in all cache misses. Thus, the measured timer_value should be greater than the threshold with respect to the originally measured timer_value for the cache, as stored in the instruction cache array. Once a timer_value within the threshold with respect to the original timer_value has been detected, the set_associativity of the cache has been detected.

Once the loop of jump instructions has been stored at step 808, then at step 810, the iterations counter and timer can be initialized and started at step 810, and the jump loop commences to be executed at step 812. Step 812 is performed in a manner similar to that shown in FIG. 4, wherein the iterations counter is checked upon each executed loop, and sufficient iterations are performed in order to nullify the effect of the initial cache missing performed during the initial pass of the loop. At step 814, the timer is then stopped and stored in the variable timer_value. At step 816, then, it is determined whether the timer_value generated from this execution of the loop is within the threshold of the stored timer_value from the array (measured timer_value/timer_value in array≦threshold). If so, then it is determined at step 818 of FIG. 8*b* whether the current set associativity is greater than 1 (that is, the cache is not direct-mapped). If the current set associativity is greater than 1, then the current set associativity is set equal to the current set associativity divided by 2 at step 820 to check for the next set-associativity (e.g., four). If timer_value is within 30% of the measured timer_value from the array, as detected at step 816, or the current set associativity is equal to 1 (it is a direct-mapped cache), then the set associativity of the cache has been detected. This value may then be stored in the set associativity field of the instruction cache array (e.g., field 333 of FIG. 3*c*). This step is shown in step 824. If this is the last instruction cache in the instruction caches array, as detected at step 826, then the process is complete. If not, then at step 828, the next instruction cache in the instruction caches array is retrieved at step 828, and the process proceeds back to step 808 to generate the next loop of jump instructions.

Figure 10:
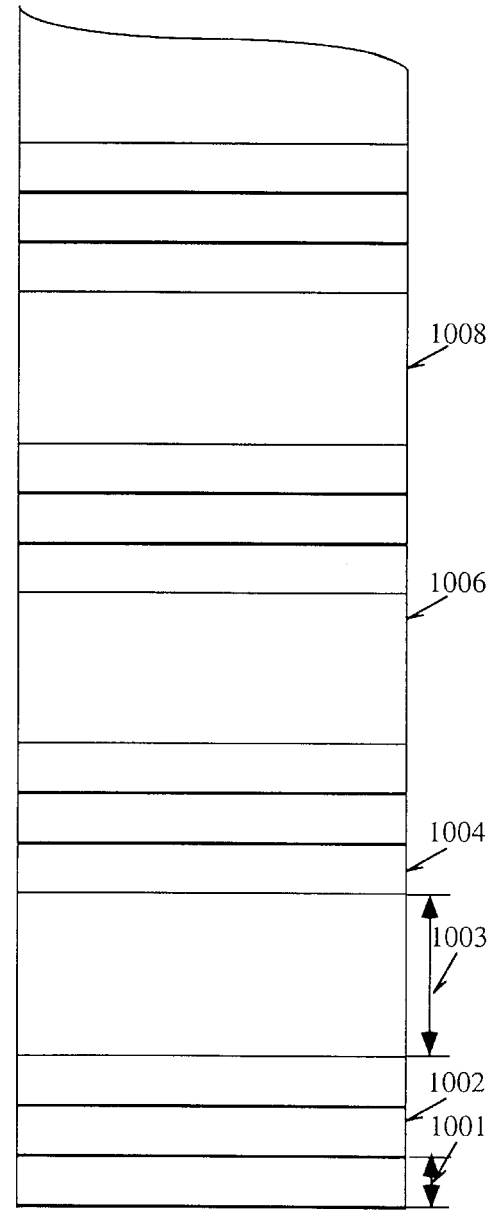
Figures 11, 12:
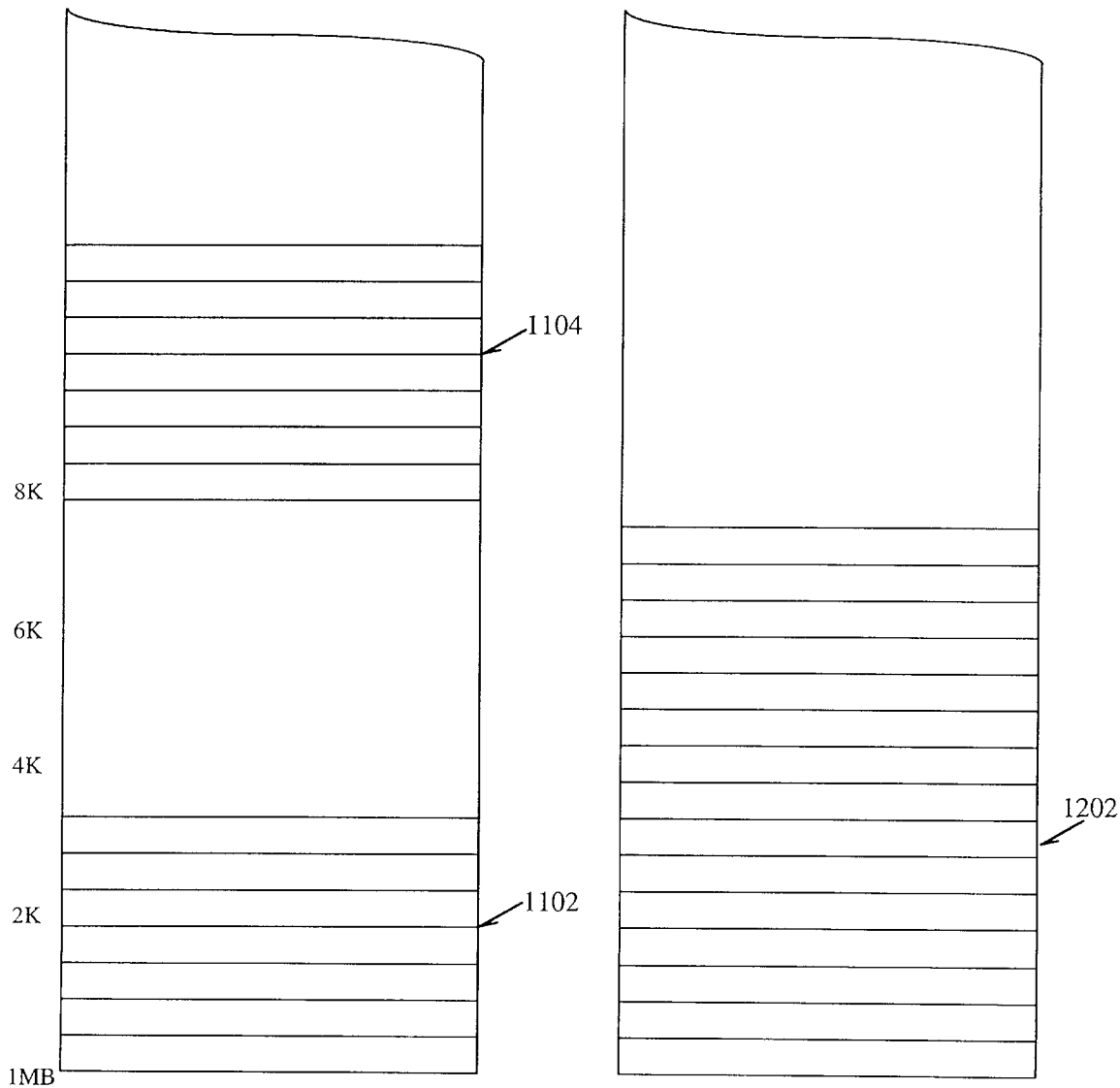

If, however, the measured timer_value is not within a threshold of the stored timer_value in the array as detected at step 816, then the next set associativity must be checked for. Thus, if upon an initial test, an 8-way set associative cache is tested for, requiring eight groups of accesses to be stored in memory according to the boundaries of an 8-way set associative cache), then the current set associativity checked for is divided by 2 at step 820 to check for a 4-way set-associative cache. Once this has been done, a loop of jump instructions is again stored at boundaries corresponding with the new set associativity. Thus, upon a subsequent iteration of the loop, four sets of the sixteen accesses are then stored in the main memory corresponding with the boundaries as shown in the pattern of FIG. 10. Thus, four sets 1002, 1004, 1006, and 1008 are stored at 4 kilobyte boundaries, wherein the accesses within each set are spaced 512 bytes apart (the distance minor_space shown in FIG. 10 as 1001). The last access in each group is the distance major_space from the first access in the next set, wherein in this case major_space=((16384/4)−(512*3))=2560.

Thus, distance 1003 (major space) is equal to 2560 bytes. Steps 808–820 continue iteratively until an access time is within the threshold of the stored timer_value in the array, and if such a timing difference is not detected, then a direct-mapped cache is assumed (set associativity=1). Thus, upon a subsequent iteration of the loop, two groups of eight accesses 1102 and 1104 are stored in memory at the zero and 8 kilobyte boundaries, and on a subsequent iteration of the loop, a single group of the sixteen accesses are stored starting at the 1 megabyte boundary. This pattern is performed for each of the known caches having a known size, and upon the detection of a timing difference within the threshold, the set associativity is then determined. For testing the set-associativity of an 8 kilobyte cache, the following variables are used:

TABLE 1

| Iteration | Set Associativity | Minor_Num | Minimum_Space | Major_Space |
|---|---|---|---|---|
| 1 | 8 | 1 | 512 | 1536 |
| 2 | 4 | 3 | 512 | 2560 |
| 3 | 2 | 7 | 512 | 4608 |
| 4 | 1 | 15 | 512 | 8704 |

Data Cache Detection

Figure 13B:
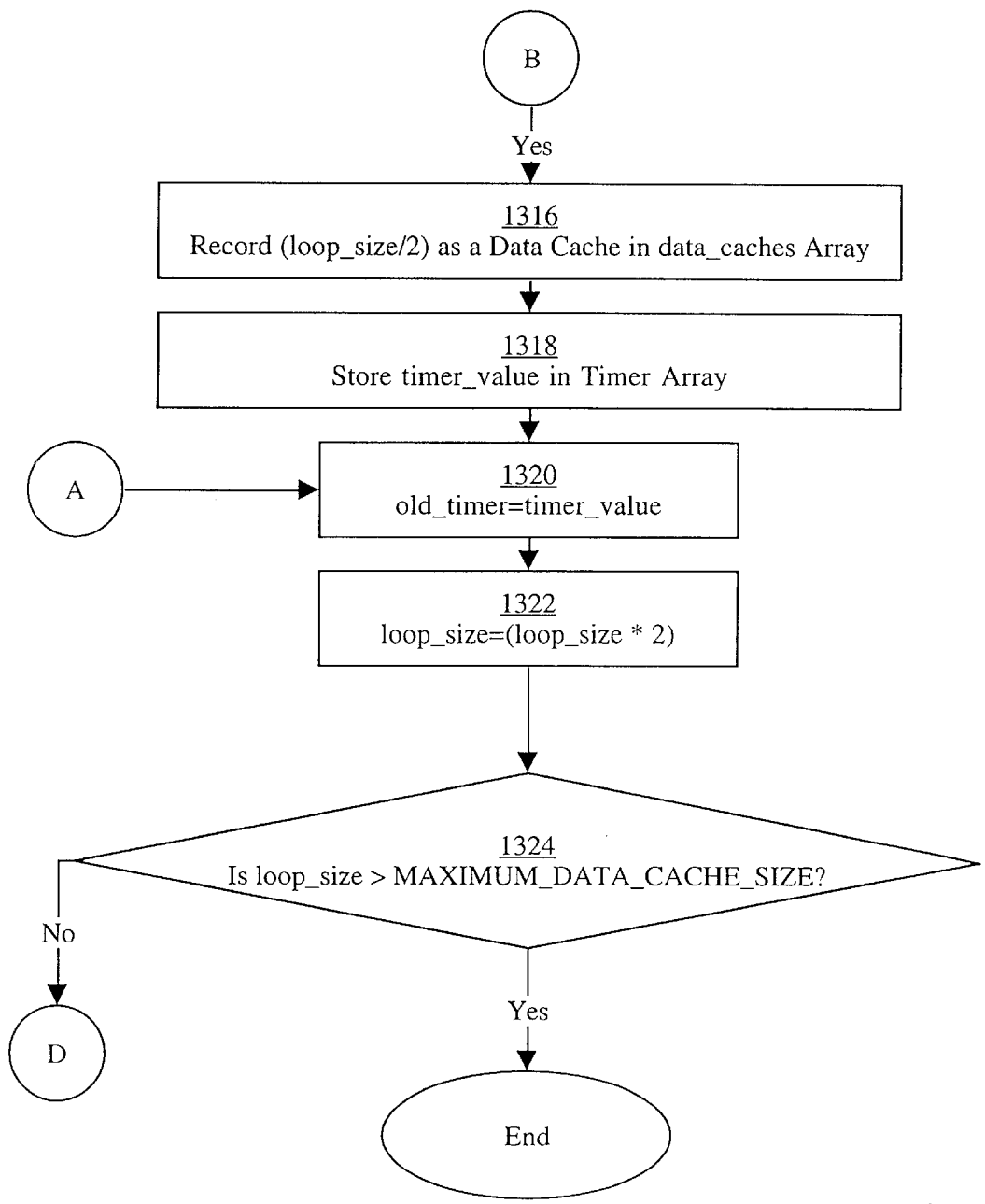
Figures 14, 15:
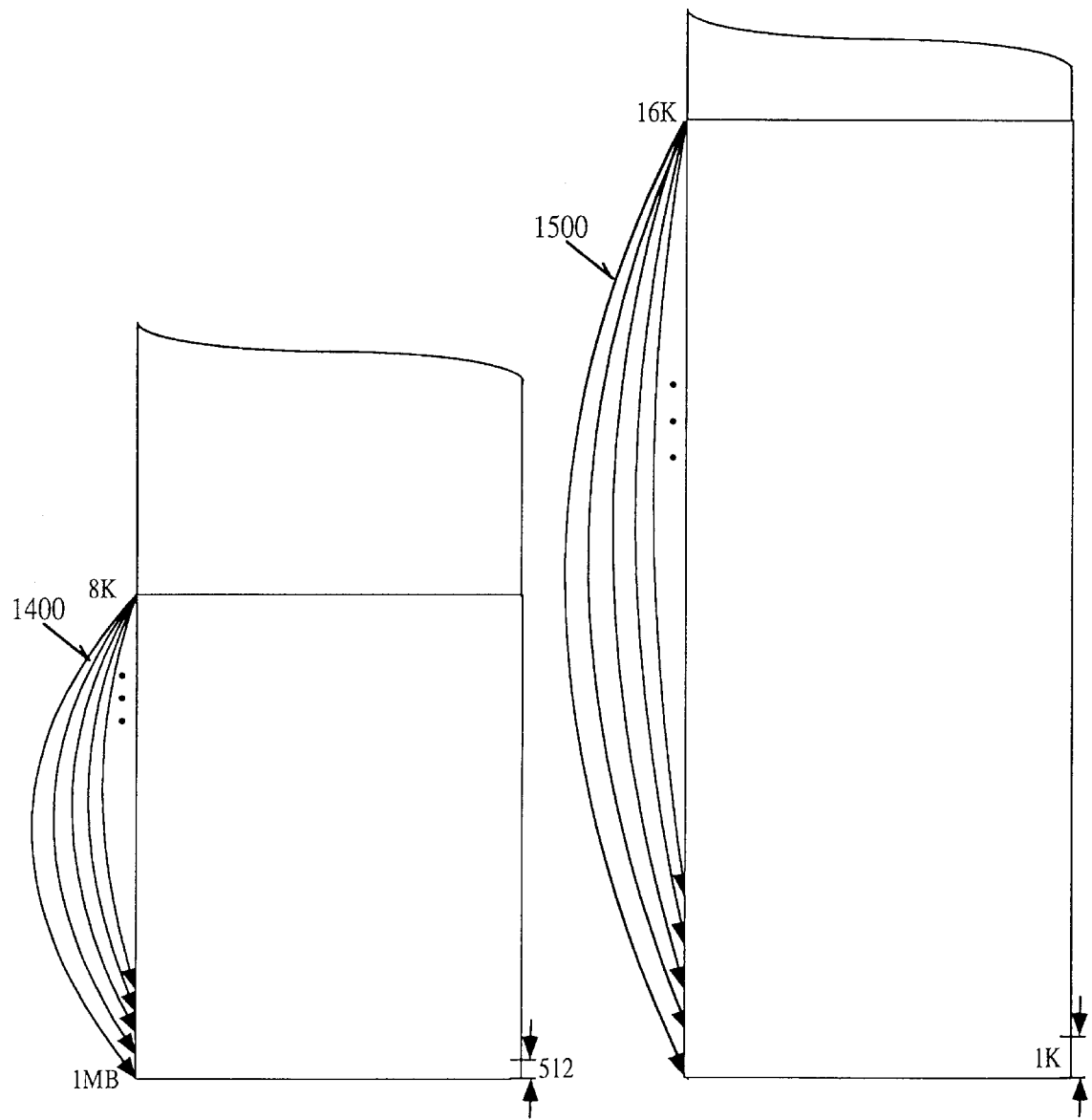
FIGS. 14 and 15 show the storage of data in memory for two iterations of the process used for determining the presence of data caches in the system.

FIGS. 13*a* and 13*b* illustrate the process 206 for finding data caches in the system. Process 206 is similar to process 202, however, instead of JMP instructions, MOV instructions for performing memory accesses (as opposed to execution of instructions stored in memory locations) are stored in system memory. Preferably, the instructions should be stored outside the tested-for memory range (as shown in FIGS. 14 and 15). However, the accesses referred to by the instructions should be within the tested-for cache range. The pattern of the referenced locations is the same as for the instruction cache detection process. As discussed with reference to the instruction loop above, in addition to the storage of the memory access instructions at 512 byte intervals in main memory (e.g., 1400 of FIG. 14), an iterations counter decrement and check is stored to determine if a number of iterations of the memory access instructions has been performed. Thus, for an initial 8 kilobyte cache, each loop comprises sixteen memory accesses followed by an instruction to decrement the counter, and a check to see if the number of iterations have been performed (e.g., the counter equals zero).

Process 206 starts at step 1302 to set the loop size to the minimum_data_cache_size for the first iteration, in this instance, 8 kilobytes. Then, a loop of MOV instructions spanning the loop size is created at step 1304. The initialization of the iterations counter and reset of the timer is then performed at step 1306, and the move loop is executed at step 1308. The timer is then stopped at step 1310, and it is determined whether the loop size is then equal to the minimum_data_cache_size, to detect the initial pass through the loop. If so, then the old_timer variable is set equal to the current measured timer_value at step 1320 shown in FIG. 13*b*, and the loop size is increased by 2 at step 1322. At step 1324, it is then detected whether the loop size has exceeded the maximum_data_cache_size (system memory/2). If not, then the process continues, returning to step 1304 for a subsequent iteration of the loop.

If, however, the loop size is not equal to the minimum_data_cache_size, as detected at step 1312 (this is not the first pass through the loop), then it is determined whether the currently measured timer_value has exceeded the old_timer value by the threshold. If so, then the tested-for cache size (loop_size/2) is stored in the data caches array at step 1316. Once this has been done, at step 1318, the timer value is stored in the array for use during the data cache set associativities test 208 illustrated in FIGS. 16*a* and 16*b*. Once this has been done, old_timer is set to the timer_value at step 1320, the loop size is doubled at step 1322, and a subsequent iteration of the loop is then performed starting at step 1304. Once the loop size has exceeded the maximum_data_cache_size, as detected at step 1324, the process is then complete.

As shown in FIGS. 14 and 15, the data loops operate in a similar fashion to the instruction loops discussed above, however, data access instructions (MOV's) are stored in memory, which reference 16 equally-spaced positions at boundaries corresponding with the possible cache size. The memory access instructions themselves are stored outside the cache size, but the data accessed is within the tested-for cache range. Thus, upon an iteration of the loop (in this example, wherein an 8 kilobyte cache is being tested for), the sixteen accesses reference sixteen equidistantly spaced locations throughout the cache range in system memory, each spaced 512 bytes apart. Then, upon a subsequent iteration of the loop, as shown in FIG. 15, the sixteen accesses are made 1 kilobyte apart. This pattern continues until the entire memory range has been checked, in this implementation, for a maximum possible cache size of system memory/2.

Data Cache Set Associativity

Figure 16A:
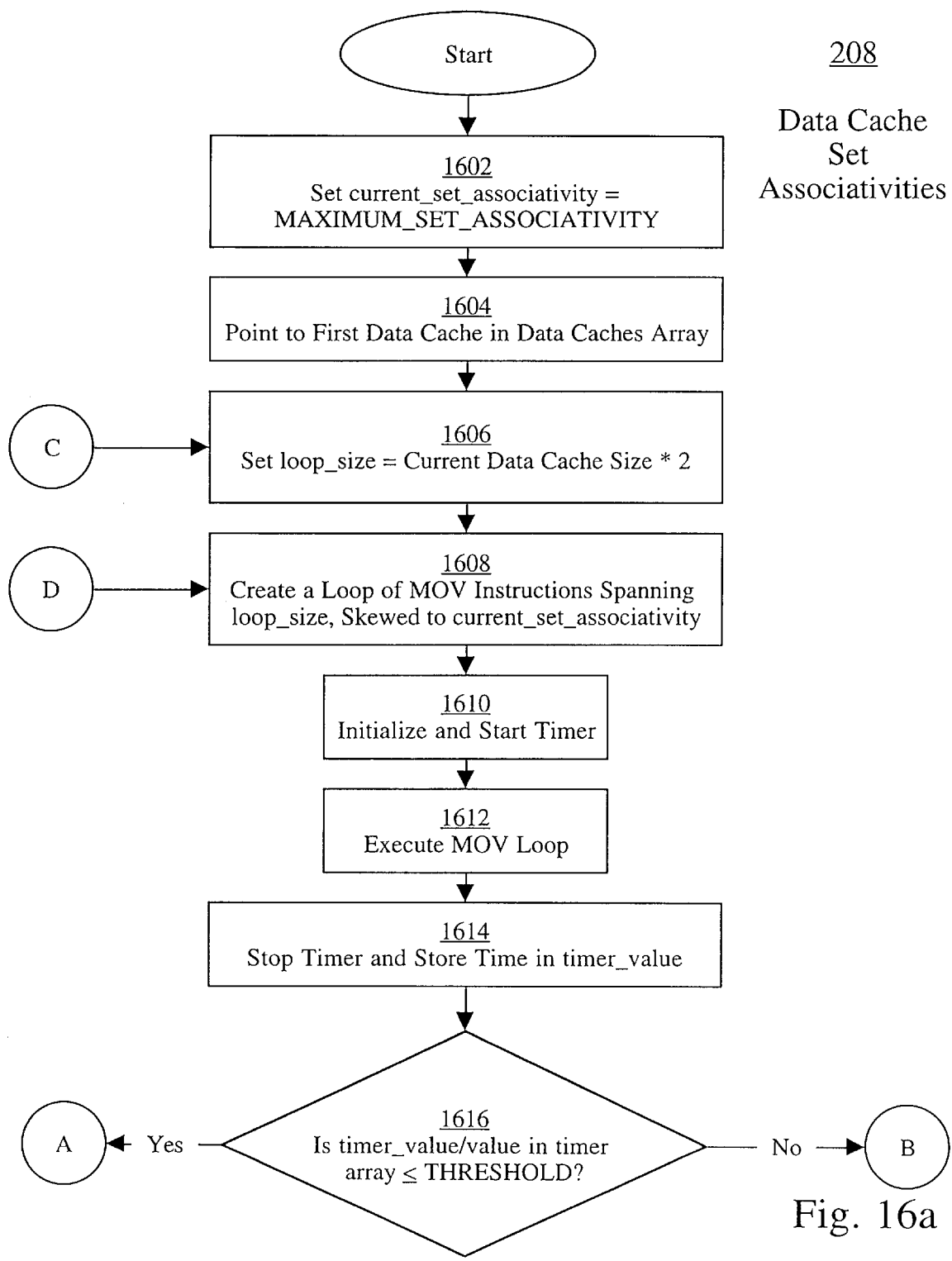
FIGS. 16a and 16b show the process used for determining set associativity of a data cache.
Figure 16B:
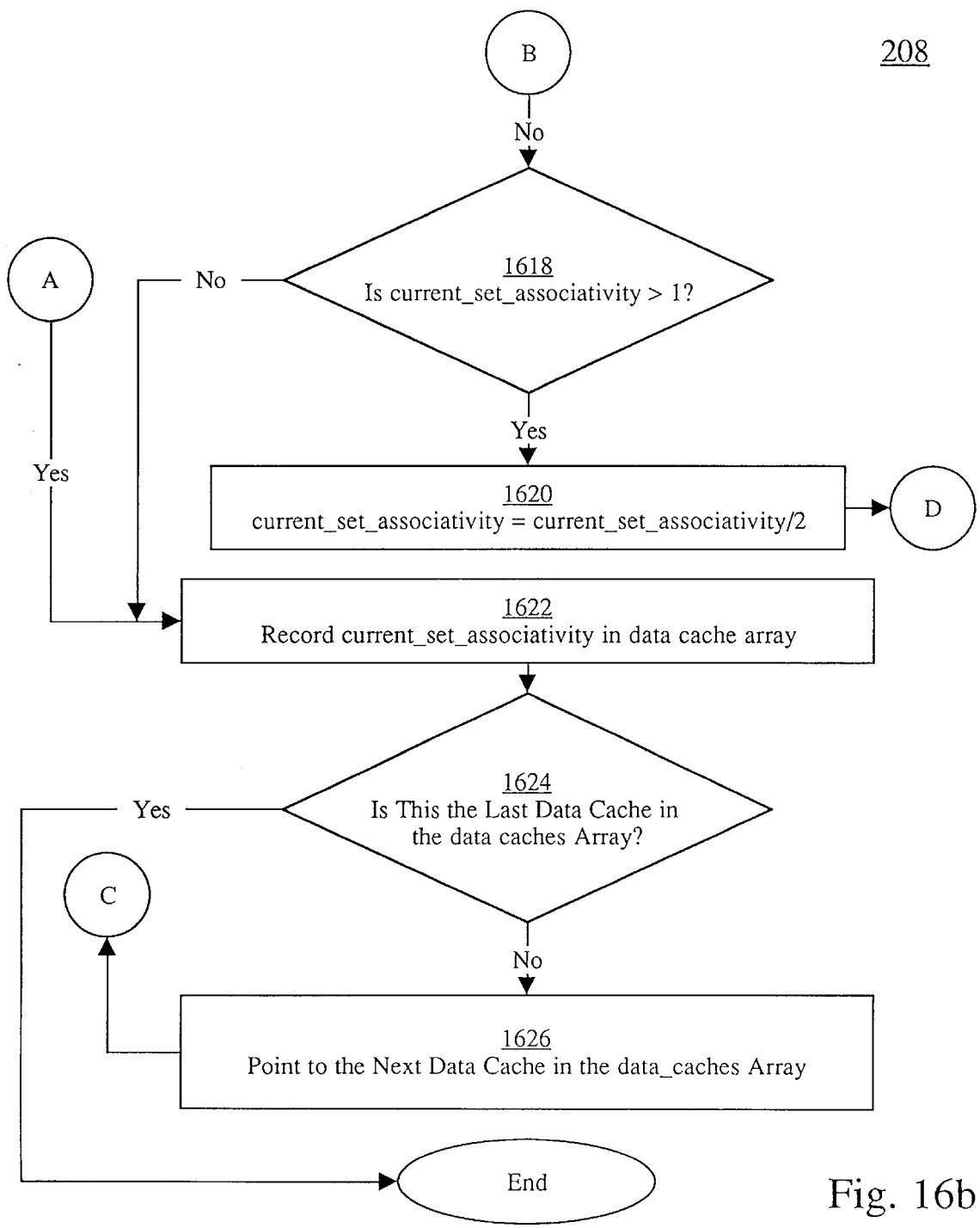

FIGS. 16a and 16b illustrate a process 208 which determines the set associativity of the data caches. Process 208 is similar to process 204 wherein accesses are spaced so that they fall at boundaries within the cache having the tested-for set associativity. Thus, the pattern shown in FIGS. 9–12 is the same for the data cache, however, memory access instructions (MOV's) are stored instead of jump (JMP) instructions. The instructions themselves are stored outside the tested-for cache range, however, the accesses are made within the range, according to FIGS. 9–12, above. The pattern for the accessed locations is the same as shown in FIGS. 9–12 and as shown in Table 1, above. Thus, process 208 starts at step 1602 to set the current set associativity to the maximum_set_associativity. That is, the process starts with the maximum possible set associativity working backward to a direct-mapped cache until a timer_value within a threshold of the stored timer value is observed, as detected at step 1616 or the accesses are stored at direct-mapped locations. At step 1604, the first data cache in the data caches array is pointed to. At step 1606, the loop size is set equal to the current cache size *2. Thus, for an 8 kilobyte cache, a loop size of 16 kilobytes is used as shown in FIG. 9. Then, at step 1608, a loop of MOV instructions spanning the loop size skewed to the current set associativity is created, as shown and discussed with reference to the example shown in FIG. 9. Thus, eight groups of two accesses for each set distributed at two kilobyte boundaries is stored.

Once the instructions have been written into memory, the timer and the iterations value is initialized at step 1610, and the data access loop (MOV instructions) is executed at step 1612, along with the associated iterations check. Once the execution of the move loop is complete (iterations=0 as shown in step 404 of FIG. 4 above), then the timer is stopped and stored in the timer value at step 1614. It is then detected at step 1616 whether the timer_value is within the threshold of the originally measured timer_value as stored in the data caches array. If not, then it is determined if the current set associativity>1 (the cache is not direct-mapped). If so, or if the timer_value is within the threshold stored timer_value for the cache (as detected at step 1616), then the current_set_associativity is stored in a manner associated with the tested-for cache (e.g., field 333 of entry 340), and the test for this data cache is thus complete at step 1622 of FIG. 16b. Once the set associativity for the data cache has been stored, it is detected at step 1624 whether this is the last data cache in the data caches array. If so, then the process is complete. If not, the next data cache in the data caches array is retrieved at step 1626, and the process can repeat, starting at step 1606.

If, however, the current timer value is not within the threshold of the stored timer_value for the cache, as detected at step 1616, then the process proceeds to step 1618 of FIG. 16b. Step 1618 determines whether the current set associativity is greater than 1. That is, the cache is other than direct-mapped at this point. If not direct mapped, then the current set associativity is divided by 2 at step 1620, and the process can iterate returning to step 1608, wherein a second loop of access instructions spanning the loop size skewed to the current set associativity (now 4 after the first iteration of the loop), are stored in the pattern shown as in FIG. 10. If this check fails on each subsequent checks of the two timer values, then two additional iterations of the loop are performed and memory accesses are stored in the patterns shown in FIGS. 11 and 12.

Thus, once all caches in the system have been tested for, their size, location, and set associativity is now known. This information can be retained in the computer system through volatile or non-volatile means, presented to a user, and other operations can be performed based upon the stored cache size/characteristics information cache.

Unified Cache Detection

Figure 17A:
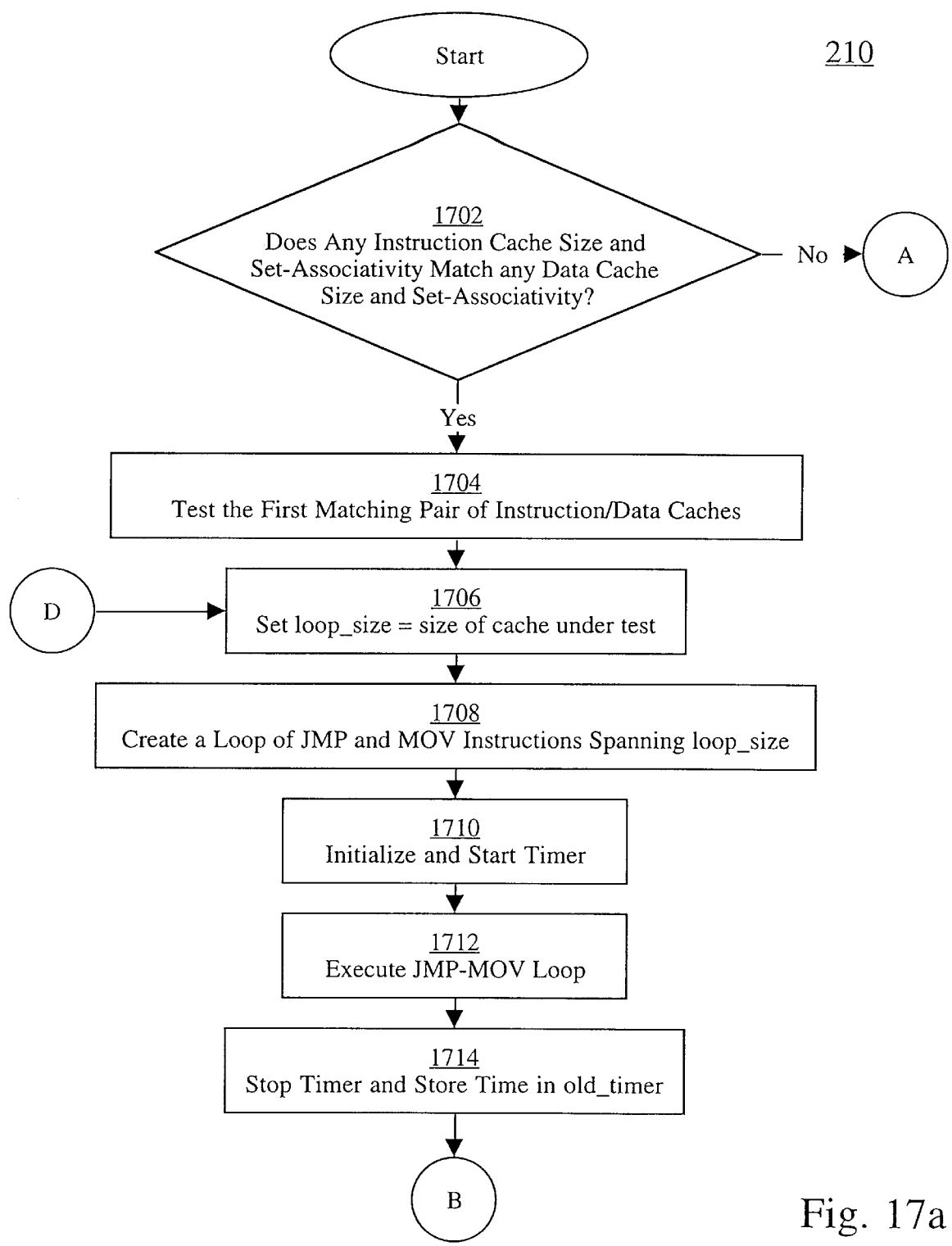
FIGS. 17a–17c show the process performed for determining whether a data and instruction cache in the system are unified.
Figure 17B:
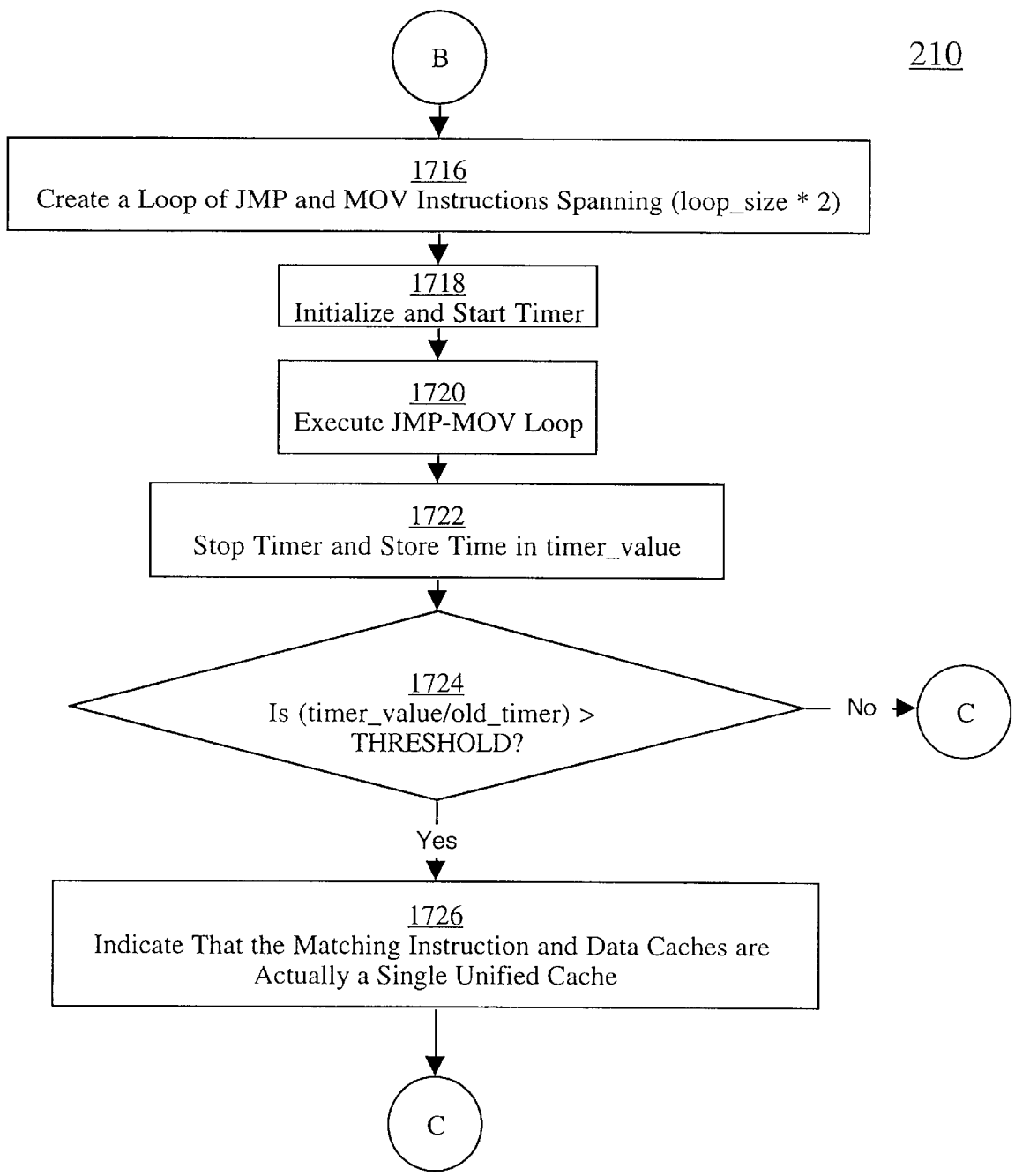

The last characteristic to be tested for the caches is whether the instruction and data caches already determined or known in some way are unified. That is, a single cache is used for storing both instructions and data. Process 210 is shown in more detail in FIGS. 17a–17c. Process 210 starts at step 1702 which first determines whether any instruction and data caches have equivalent size and equivalent set associativity characteristics. If so, then the process can be performed. If not, then no caches in the system can be unified, because they do not have the same size and associativity characteristics. If there are, at step 1704, the first matching pair of instruction and data caches is retrieved. Other pertinent matching characteristics (e.g., access time) may be used if appropriate in the given implementation.

Figure 18:
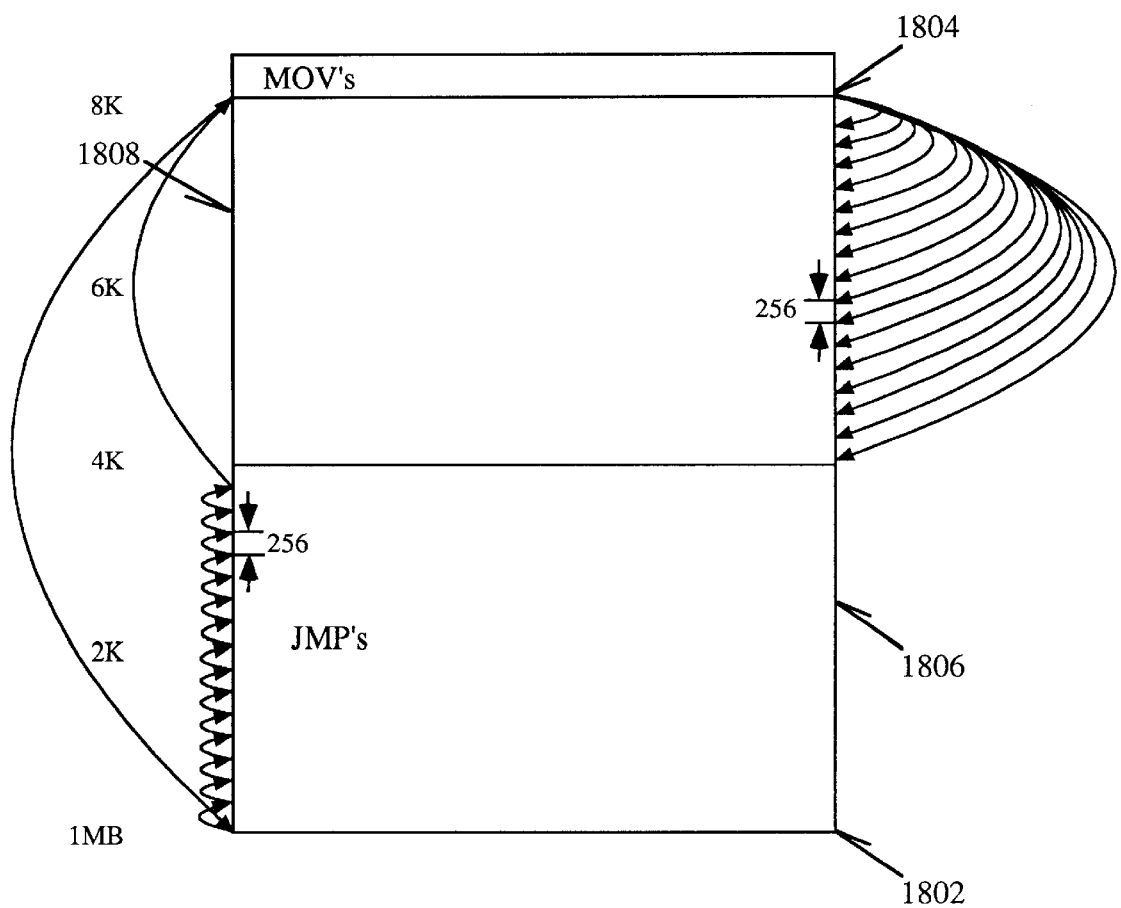
FIGS. 18 and 19 show the storage of instructions and data in message for two iterations of the unified cache detection process.

At step 1706, the loop size is then set equal to the size of the cache under test. Then, at step 1708, the loop size is populated with JMP and MOV instructions. This is done in a manner similar to that illustrated in FIG. 18. For example, for the memory loop size being tested for (in this instance, 8 kilobytes), a first portion of the cache range starting at 1 megabyte is populated with sixteen memory access instructions such as MOV instructions. These instructions reside at some location 1804 outside the range being tested for starting at the 1 megabyte range of the memory, however, the data accesses are within the tested-for cache range. Similar to the cache process described above, the data access resides at 256 byte intervals within one portion of the memory 1804. Jump instructions may then be stored in a second portion of the memory range 1806. Thus, the 8 kilobyte loop size being tested for is populated half by 16 memory access instructions and the other half by 16 jump instructions. As with the instruction cache detection process described above, the final jump instruction returns to the beginning of the first memory access instruction along with an appropriate iterations check for the inner loop. Again, sufficient iterations are performed to account for any variances in access time during the execution of the loop. Once the jump and move instruction spanning the loop size has been stored at step 1708, the timer and iterations value is then initialized at step 1710, and at step 1712, the jump/move loop is executed. Once the requisite number of iterations has been performed, then the timer is stopped and stored in an old_timer variable, step 1714. The process can then continue on FIG. 17b.

Figure 19:
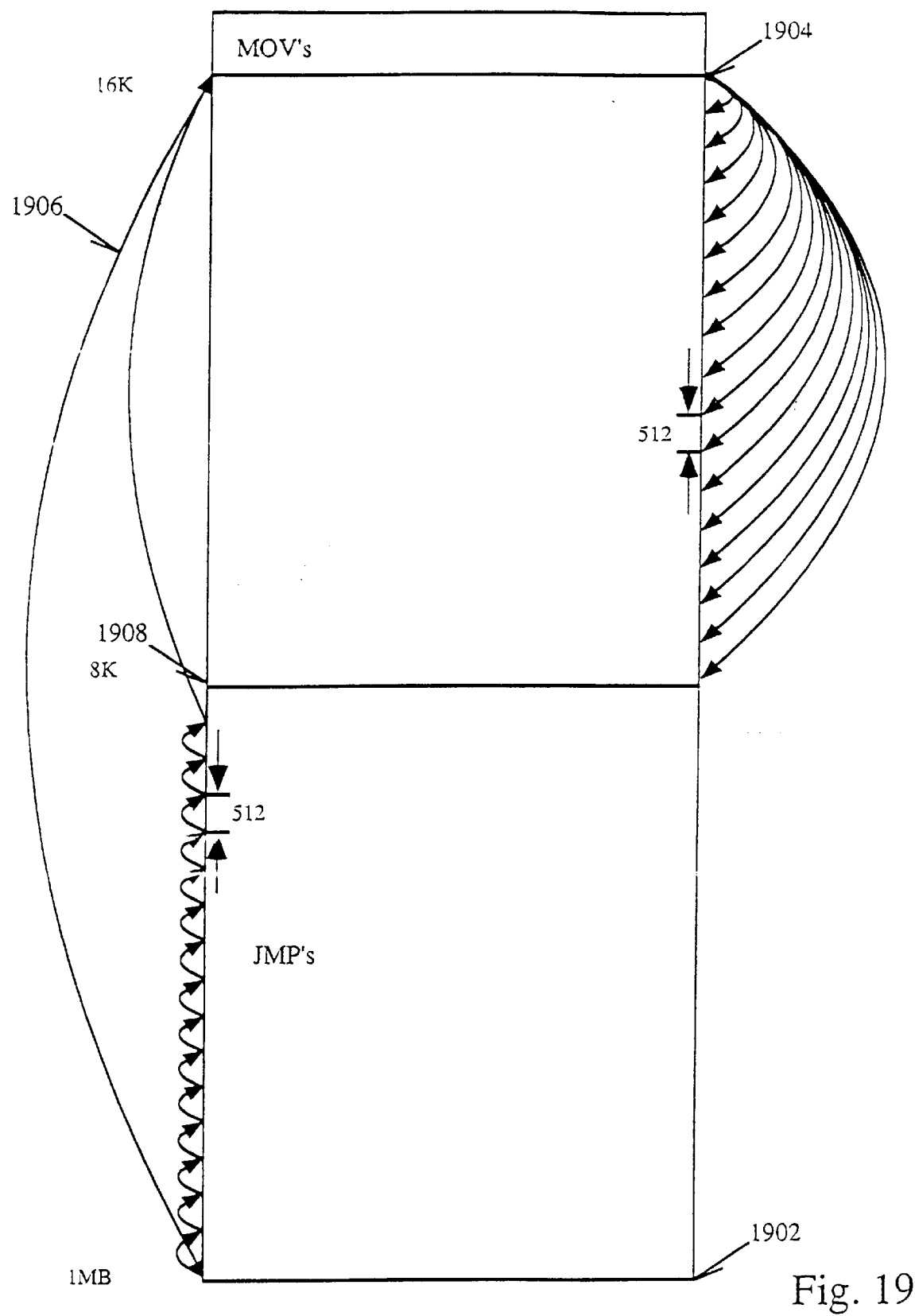

Starting at step 1716, a second loop of jump and move instructions spanning twice the cache size is then created at step 1716. This loop has a similar 16 accesses for each of the jump and move instructions, distributed over twice the original loop size. The instructions are stored at 512 byte intervals, so the timing between execution and accesses in the first loop and the second loop may be compared. Once the second loop has been created, at step 1716, according to the format shown in FIG. 19, the iterations and timer can then be initialized and commence execution at step 1718. Then, the jump/move loop is executed at step 1720, for the requisite number of iterations. The timer is then stopped at step 1722, and stored in the timer_value. It is then determined at step 1724 whether the timer_value exceeds the old_timer value by the threshold. If not, then the caches are not unified and process 210 proceeds to step 1728 of FIG. 17c.

If, however, the timer value has exceeded the old_timer value by the threshold, as detected at step 1724, then the instruction and data caches are considered to be unified, that is, that the accessing of the data access instructions has overwritten the jump instructions (or vice-versa) and the slow execution of the loop was due to cache missing, step 1726. The arrays can then be merged into a single entry for both the data and instruction caches, reflecting a unified type of cache with an appropriate type stored in field 331 of FIG. 3c. If, however, the timer value does not exceed old_timer by the threshold, as detected at step 1724, then the execution of the jump/move loop resulted in all cache hits (no timing difference was detected). If this is the case, then the jump and move instructions must have been cached in separate caches, and the instruction and data caches are therefore not unified. The separate cache entries thus remain as is.

Figure 17C:
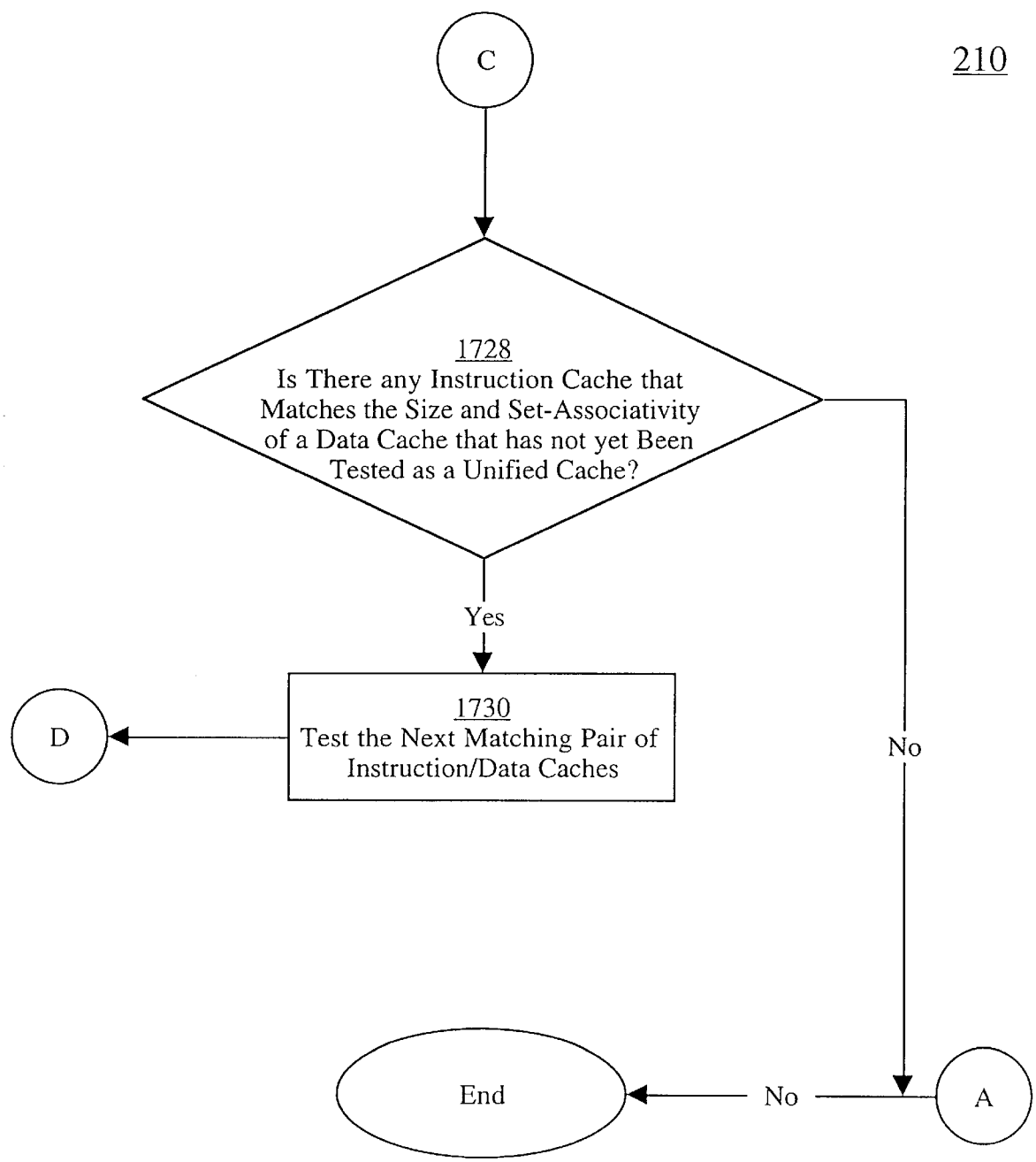

Process 210 then proceeds to step 1728 which determines whether there are any more instruction and data caches which have the same characteristics. If so, then the next pair is retrieved at step 1730 and the process repeats, starting at step 1706. If not, then process 210 is complete as shown in FIG. 17c.

Thus, an improved method and apparatus for detecting the presence and characteristics of a cache in a computer system has been described. Although the present invention has been described with reference to certain implementations and specific embodiments thereof, it can be appreciated by one skilled in the art that the present invention is only to be limited by the appended claims which follow. Thus, the foregoing description and FIGS. 1–19 are to be viewed in an illustrative sense only, and do not limit the present invention.

What is claimed is:

1. An automatic method in a computer system of determining the presence of a cache having a first possible size comprising:
   a. writing data at first specified boundaries that are chosen as a function of said first possible size of said cache and a maximum assumed set associativity of said cache;
   b. accessing said data stored at said first specified boundaries;
   c. timing said accessing of said data at said first specified boundaries to produce a first timing value;
   d. writing data at second specified boundaries that are chosen as a function of a second possible size of said cache and the maximum assumed set associativity of said cache, wherein said second possible size is at least twice as large as said first possible size of said cache;
   e. accessing said data stored at said second specified boundaries;
   f. timing said accessing of said data at said second specified boundaries to produce a second timing value; and
   g. comparing said second and said first timing values, and indicating a cache size of said cache equal to said first possible cache size if said second timing value exceeds said first timing value by a threshold.

2. The method of claim 1 further comprising the step of repeating said steps d–g, wherein said second timing value, said second possible size, and said second specified boundaries of each iteration become said first timing value, said first possible size, and said first specified boundaries of an immediately subsequent iteration until said second timing value exceeds said first timing value by at least said threshold.

3. The method of claim 1 wherein said steps of writing of said data includes writing jump instructions.

4. The method of claim 3 wherein each of said steps of accessing said data include executing said jump instructions, wherein each of said jump instructions causes a jump to a next of said jump instructions at a next of said first or second specified boundaries.

5. The method of claim 1 wherein said steps of writing of said data includes writing memory access instructions.

6. The method of claim 5 wherein each of said steps of accessing said data include executing said memory access instructions.

7. The method of claim 1 further comprising the step of storing a first possible size for the cache in a structure of cache sizes and repeating said steps d–g and the step of storing a first possible size for said cache, and upon each iteration of said steps d–g and said step of storing, said second timing value, said second possible size and said second specified boundaries become said first timing value, said first possible size and said first specified boundaries of an immediately subsequent iteration until said first possible size of said cache is equal to half a total address range of said computer system.

8. An automatic method in a computer system of determining the associativity of a cache having a first size comprising:
   a. writing data at first specified boundaries that are chosen as a function of a cache size that is double said first size of said cache, and a first possible associativity of said cache;
   b. accessing said data stored at said first specified boundaries;
   c. timing said accessing of said data at said first specified boundaries to produce a first timing value;
   d. writing data at second specified boundaries that are chosen as a function of said doubled cache size and a second possible associativity that is half said first possible associativity of said cache;
   e. accessing said data stored at said second specified boundaries;
   f. timing said accessing of said data at said second specified boundaries to produce a second timing value; and
   g. comparing said second and said first timing values and indicating said assocaitivity of said cache is equal to said second possible associativity if said first timing value exceeds said second timing value by at least a threshold.

9. The method of claim 8 further comprising the step of repeating said steps d–g, wherein said second timing value and said second specified boundaries of each iteration become said first timing value and said first specified boundaries of an immediately subsequent iteration until said first timing value exceeds said second timing value by at least said threshold.

10. The method of claim 8 wherein said steps of writing of said data includes writing jump instructions.

11. The method of claim 10, wherein each of said steps of accessing said data includes executing said jump instructions, wherein each of said jump instructions causes a jump to a next of said jump instructions at a next of said first or said second specified boundaries.

12. The method of claim 8 wherein said steps of writing of said data includes writing memory access instructions.

13. The method of claim 8 wherein each of said steps of writing of said data includes writing memory access instructions.

14. The method of claim 8 further comprising the step of storing a first possible associativity for the cache in a structure of cache associativities, and repeating said steps d–g and the step of storing a first possible associativity for all caches in said computer system, wherein upon each iteration of said steps d–g and the step of storing the first possible associativity, said second timing value and said second specified boundaries for each iteration become said first timing value and said first specified boundaries of an immediately subsequent iteration until all said caches in said computer system have been tested.

15. An automatic method in a computer system of determining whether an instruction cache in a first location in a memory of said computer system having a first size and a data cache in a second location in the memory of said computer system adjacent to said first location having said first size are unified, the method comprising:

a. writing instruction data at first specified boundaries chosen as a function of said first size of said instruction cache;
   b. writing data at a second specified boundaries chosen as a function of said first size of said data cache;
   c. executing said instruction data stored at said first specified boundaries;
   d. accessing said data stored at said second specified boundaries;
   e. timing said executing of said instruction data at said first specified boundaries and said accessing of said data at said second specified boundaries to produce a first timing value;
   f. writing said instruction data at third specified boundaries chosen as a function of an instruction cache size that is double said first size of said instruction cache in a third location in said memory of said computer system;
   g. writing said data at fourth specified boundaries chosen as a function of a data cache size that is double said first size of said data cache in a fourth location in said memory of said computer system, wherein said fourth location in said memory of said computer system is adjacent to said third location;
   h. executing said instruction data stored at said third specified boundaries;
   i. accessing said data stored at said fourth specified boundaries;
   j. timing said executing of said instruction data at said third specified boundaries and said accessing of said data at said fourth specified boundaries to produce a second timing value;
   k. comparing said second and said first timing values, and indicating that said data cache and said instruction cache are unified if said second timing value exceeds said first timing value by at least a threshold.

16. An automatic method for determining whether an instruction cache and a data cache are unified, the method comprising:

a. timing execution of instructions at first specified boundaries corresponding with a first size of said instruction cache in a first location in a memory and access of data at second specified boundaries corresponding with a first size of said data cache in a second location in said memory, wherein said second location in said memory is adjacent to said first location, to produce a first timing value; and
   b. comparing said first timing value with an estimated access time of said instruction and data caches, and indicating that said data cache and said instruction cache are unified if said first timing value is within a threshold of said estimated access time.

17. An apparatus for determining whether an instruction cache and a data cache are unified comprising:

a. a timing circuit coupled to computer system memory for timing execution of instructions at first specified boundaries chosen as a function of a known size and a known set associativity of instruction cache in a first location in a memory of said computer system and accessing of data at second specified boundaries chosen as a function of a known size and a known set associativity of said data cache in a second location in said memory of said computer system, wherein said second location in said memory of said computer system is adjacent to said first location to produce a first timing value; and
   b. a comparison circuit coupled to said timing circuit for comparing said first timing value with an estimated access time of said instruction and data caches, and indicating that said data cache and said instruction cache are unified if said first timing value is within a threshold of said estimated access time.

18. A cache detection apparatus comprising:

a timing circuit to time accesses of data stored at a first specified boundaries of a computer system memory chosen as a function of a first possible size and maximum assumed set associativity to produce a first timing value, and a second iteration at a second specified boundaries of the computer system memory chosen as a function of a second possible size and maximum assumed set associativity to produce a second timing value; and
   a comparison circuit, coupled to the timing circuit, to determine whether said second timing value exceeds said first timing value by at least a threshold to identify a cache of said first possible size.

19. The apparatus of claim 18, further comprising an iteration circuit for activating the timing circuit iteratively, wherein said second timing value and said second specified boundaries and maximum assumed set associativity for each iteration become the first timing value and said first specified boundaries and maximum assumed set associativity for an immediately subsequent iteration, and wherein the iteration circuit iteratively activates the timing circuit until a cache size is identified.

20. The apparatus of claim 18, wherein said second specified boundaries is twice as large as said first specified boundaries.

21. An apparatus for determining cache associativity for a cache having a first size, the apparatus comprising:

a timing circuit to time accesses of data stored at a first specified boundaries chosen as a function of a cache size that is double said first cache size and a first possible associativity of said cache to produce a first timing value, and to time accesses of data stored at a second specified boundaries chosen as a function of said doubled cache size and a second possible associativity that is half said first possible associativity of said cache; and
   a comparison circuit, coupled to the timing circuit, operative to compare said second timing value and said first timing value and indicate said associativity of said cache is equal to said second possible associativity if said first timing value exceeds said second timing value by at least a threshold.

22. The apparatus of claim 21, further comprising an iteration circuit for activating the timing circuit iteratively, wherein said second timing value, second specified boundaries, and said second possible associativity for each iteration become the first timing value, first specified boundaries, first possible associativity for an immediately subsequent iteration, and wherein the iteration circuit iteratively activates the timing circuit until a cache associativity is identified.

23. A computer readable storage medium having stored thereon a plurality of computer executable instructions for determining cache size which, when executed, perform a number of functions including:

a timing function to time accesses of data stored at a first specified boundaries of a cache chosen as a function of a first possible size and maximum assumed set associativity of said cache to produce a first timing value, and at a second specified boundaries chosen as a function of a second possible size and maximum assumed set associativity of said cache to produce a second timing value; and a comparison function, responsive to said timing function, to determine whether said second timing value exceeds said first timing value by at least a threshold to identify a cache of said first possible size.

24. The computer readable medium of claim 23, wherein said functions further comprise an iteration function which, when executed, operates to iteratively invoke the timing function and the compare function, wherein the second timing value, second possible size and maximum assumed set associativity of each iteration become the first timing value, first possible size and maximum assumed set associativity of subsequent iterations until the second timing value exceeds the first timing value by at least said threshold.

25. A computer readable storage medium having stored thereon a plurality of computer executable instructions for determining cache associativity for a cache of a first size which, when executed, perform a number of functions including:

a timing function to time accesses of data stored at a first specified boundaries chosen as a function of a cache size that is double the first size of the cache and a first possible set associativity to produce a first timing value, and at a second specified boundaries chosen as a function of the doubled cache size and a second possible associativity that is half said first possible associativity of said cache to produce a second timing value; and a comparison function, responsive to said timing function, to compare the first and second timing values, wherein if the first timing value exceeds the second timing value by at least a threshold, then indicating said associativity of said cache is equal to said second possible associativity.

26. The computer readable medium of claim 25, wherein said functions further comprise an iteration function which, when executed, operates to iteratively invoke the timing function and the compare function, wherein the second timing value, second boundaries and second possible set associativity of each iteration become the first timing value, first boundaries and first possible set associativity of subsequent iterations until the first timing value exceeds the second timing value by at least said threshold.

27. A computer readable storage medium having stored thereon a plurality of computer executable instructions for determining whether an instruction cache and a data cache are unified which, when executed, perform a number of functions including:

a timing function to time execution of instructions stored at first specified boundaries chosen as a function of a first size of said instruction cache in a first location in a memory, and to time the access of data stored at second specified boundaries chosen as a function of a first size of said data cache in a second location in said memory, wherein said second location in said memory is adjacent to said first location, to produce a first timing value; and a comparison function, responsive to said timing function, to compare the first timing value with an estimated access time of said instruction and data caches, and indicating that said data cache and said instruction cache are unified if said first timing value is within a threshold of said estimated access time.

* * * * *